United States Patent
Soundrapandian et al.

(10) Patent No.: US 11,330,204 B1
(45) Date of Patent: May 10, 2022

(54) EXPOSURE TIMING CONTROL FOR MULTIPLE IMAGE SENSORS

(71) Applicant: QUALCOMM Incorporated, San Diego, CA (US)

(72) Inventors: Jeyaprakash Soundrapandian, San Diego, CA (US); Ramesh Ramaswamy, San Diego, CA (US); Sureshnaidu Laveti, San Diego, CA (US); Rajakumar Govindaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/322,718

(22) Filed: May 17, 2021

(51) Int. Cl.
  *H04N 5/353* (2011.01)
(52) U.S. Cl.
  CPC ......... *H04N 5/3535* (2013.01); *H04N 5/3532* (2013.01)
(58) Field of Classification Search
  CPC .......................... H04N 5/3535; H04N 5/3532
  USPC ....................................................... 348/362
  See application file for complete search history.

(56) References Cited

U.S. PATENT DOCUMENTS

| 2016/0044297 A1* | 2/2016 | Segawa | G06T 7/593 |
| | | | 348/47 |
| 2018/0309919 A1* | 10/2018 | Naing | H04N 5/3765 |
| 2020/0267372 A1* | 8/2020 | Taketani | H04N 13/239 |

* cited by examiner

*Primary Examiner* — Lin Ye
*Assistant Examiner* — Chan T Nguyen
(74) *Attorney, Agent, or Firm* — Polsinelli

(57) ABSTRACT

Examples are described of automatic exposure timing synchronization. An imaging system includes a first image sensor configured to capture a first image according to a first exposure timing, including by exposing first region of interest (ROI) image data at the first image sensor for a first ROI exposure time period. Based on the first exposure timing, the imaging system sets a second exposure timing for a second image sensor to capture a second image. Capture of the second image according to the second exposure timing includes exposure of second ROI image data at the second image sensor for a second ROI exposure time period. The second exposure timing may be set so that the start of the second ROI exposure time period aligns with the start of the first ROI exposure time period, and/or so that the first and second ROI exposure time periods overlap.

30 Claims, 16 Drawing Sheets

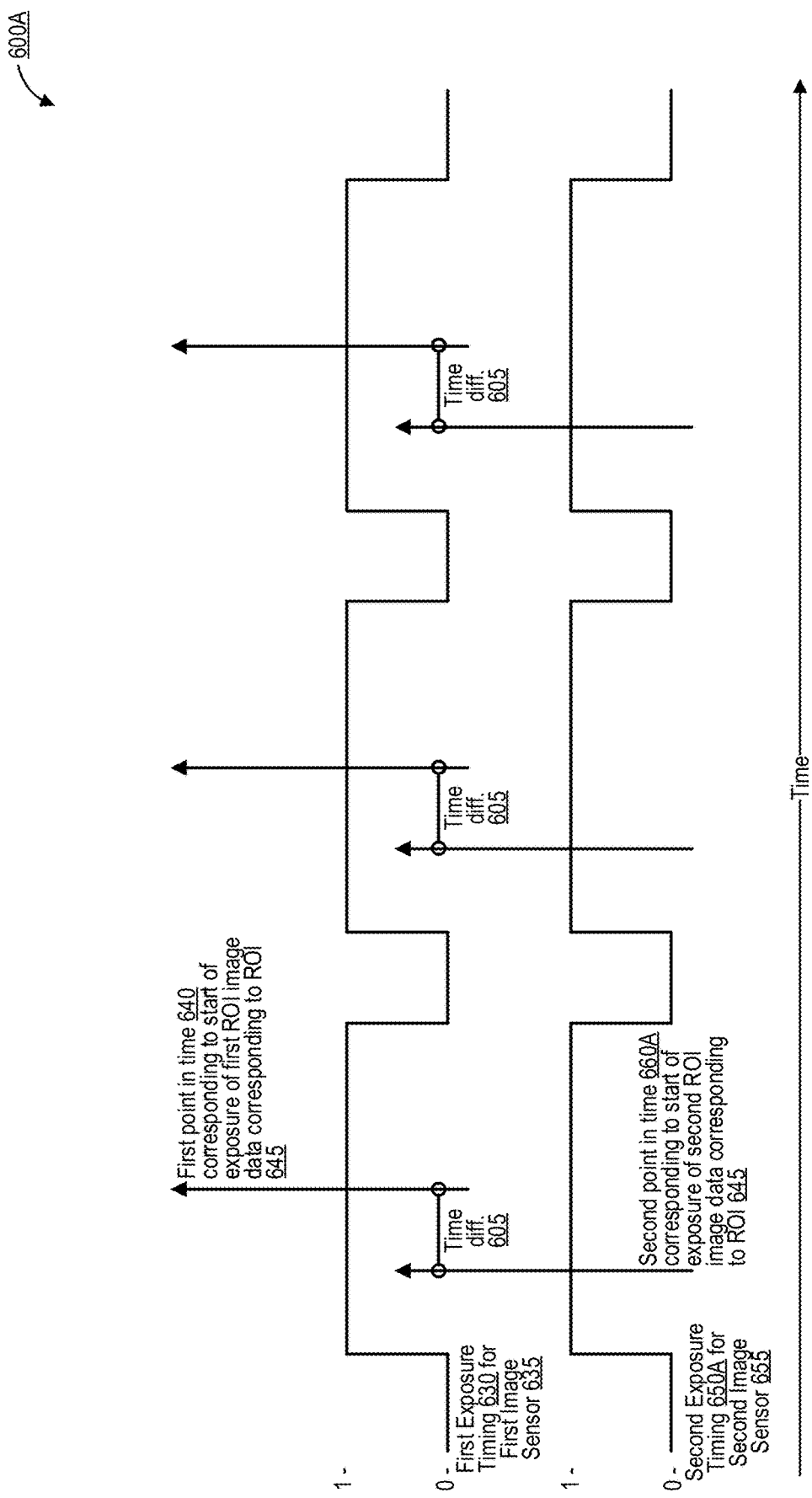

EXPOSURE TIMING CONTROL FOR MULTIPLE IMAGE SENSORS

FIELD

The present disclosure is related to image capture and processing. For example, aspects of the present disclosure relate to systems and techniques for performing exposure timing control for image sensors.

BACKGROUND

In imaging, exposure time refers to a period of time during which an image sensor of a camera is exposed to light from a scene that is to be photographed by the camera. The camera generally opens an aperture to begin the exposure time. The light passes through the aperture to reach the image sensor. The camera closes the aperture to end the exposure time, blocking further light from reaching the image sensor.

Cameras with rolling shutters gradually uncover and cover the image sensor to begin and end the exposure time, respectively. Instead of exposing the entire image sensor all at once, cameras with rolling shutters begin exposure of different rows sequentially, typically from a top row to a bottom row. Because of this, the bottom of the resulting image depicts the scene at a slightly later point in time than the top of the image does.

Some devices can use two cameras to capture two images of the same scene. For example, a device can capture left-side and right-side stereoscopic images of the same scene, or can capture two images of the same scene with different zoom levels. Even if the two images are captured contemporaneously, differences in image sensor exposure timing between the two cameras can cause the two images to depict the same part of the scene (e.g., a person) at slightly different points in time. This asynchrony can cause errors in operations that use both images, such as stereoscopic depth mapping or merging of the two images together.

SUMMARY

Systems and techniques are described herein for automatic imaging synchronization. In some examples, an imaging system can include a first image sensor that is configured to, and can, capture a first image of a scene according to a first exposure timing. Capture of the first image by the first image sensor can include exposure of first region of interest (ROI) image data at the first image sensor for a first ROI exposure time period. The first ROI image data can depict a region of the scene as depicted in the first image (e.g., an object or individual detected in the scene), a region of the first image (e.g., a center of the first image), or both. Based on the first exposure timing, the imaging system can set a second exposure timing. A second image sensor is configured to, and can, capture a second image of the scene according to the second exposure timing. Capture of the second image by the second image sensor can include exposure of second ROI image data at the second image sensor for a second ROI exposure time period. The second ROI image data can depict a region of the scene as depicted in the second image (e.g., an object or individual detected in the scene), a region of the second image (e.g., a center of the second image), or both. The first ROI image data and the second ROI image data can depict the same region of the same scene (e.g., the same individual or object) and/or the same image region (e.g., the centers of the first and second images respectively). The second exposure timing may be set so that the start of the second ROI exposure time period aligns with the start of the first ROI exposure time period. The second exposure timing may be set so that the first exposure times overlaps with the second exposure time. Aligning the start of the second ROI exposure time period with the start of the first ROI exposure time period can reduce or eliminate asynchrony between the first ROI image data in the first image and the second ROI image data in the second image.

In some examples, the imaging system can set the second exposure timing by postponing, preponing, or otherwise moving and/or adjusting a prior second exposure timing under which the second image would have been exposed for a prior second ROI exposure time period. Such adjustment may be used if, under prior second exposure timing, there would have been a sufficiently large timing difference (e.g., greater than a threshold timing difference) between the start of the prior second ROI exposure time period and the start of the first ROI exposure time period. The first image sensor can capture the first image according to the first exposure timing. The imaging system can receive the first image from the first image sensor, and the second image sensor can capture the second image according to the second exposure timing, and the imaging system can receive the second image from the second image sensor. In some examples, the imaging system can display and/or transmit the first image and/or the second image. In some cases, the imaging system can use the first image and the second image for stereo matching, scene mapping, image merging, or other techniques.

In one example, an apparatus for imaging is provided. The apparatus includes a memory and one or more processors (e.g., implemented in circuitry) coupled to the memory. The one or more processors are configured to and can: identify a first exposure timing corresponding to capture of a first image by a first image sensor, wherein capture of the first image by the first image sensor according to the first exposure timing includes exposure of first region of interest (ROI) image data at the first image sensor for a first ROI exposure time period; set a second exposure timing corresponding to capture of a second image by a second image sensor based on the first exposure timing, wherein capture of the second image by the second image sensor according to the second exposure timing includes exposure of second ROI image data at the second image sensor for a second ROI exposure time period that overlaps with the first ROI exposure time period; receive the first image from the first image sensor, the first image captured by the first image sensor according to the first exposure timing; and receive the second image from the second image sensor, the second image captured by the second image sensor according to the second exposure timing.

In another example, a method of imaging is provided. The method includes receiving an image captured by an image sensor. The method includes: identifying a first exposure timing corresponding to capture of a first image by a first image sensor, wherein capture of the first image by the first image sensor according to the first exposure timing includes exposure of first region of interest (ROI) image data from the first image sensor for a first ROI exposure time period; setting a second exposure timing corresponding to capture of a second image by a second image sensor based on the first exposure timing, wherein capture of the second image by the second image sensor according to the second exposure timing includes exposure of second ROI image data from the second image sensor for a second ROI exposure time period that overlaps with the first ROI exposure time period; receiving the first image from the first image sensor, the first image captured by the first image sensor according to the first exposure timing; and receiving the second image from the second image sensor, the second image captured by the second image sensor according to the second exposure timing.

In another example, a non-transitory computer-readable medium is provided that has stored thereon instructions that, when executed by one or more processors, cause the one or more processors to: identify a first exposure timing corresponding to capture of a first image by a first image sensor, wherein capture of the first image by the first image sensor according to the first exposure timing includes exposure of first region of interest (ROI) image data at the first image sensor for a first ROI exposure time period; set a second exposure timing corresponding to capture of a second image by a second image sensor based on the first exposure timing, wherein capture of the second image by the second image sensor according to the second exposure timing includes exposure of second ROI image data at the second image sensor for a second ROI exposure time period that overlaps with the first ROI exposure time period; receive the first image from the first image sensor, the first image captured by the first image sensor according to the first exposure timing; and receive the second image from the second image sensor, the second image captured by the second image sensor according to the second exposure timing.

In another example, an apparatus for image processing is provided. The apparatus includes: means for identifying a first exposure timing corresponding to capture of a first image by a first image sensor, wherein capture of the first image by the first image sensor according to the first exposure timing includes exposure of first region of interest (ROI) image data from the first image sensor for a first ROI exposure time period; means for setting a second exposure timing corresponding to capture of a second image by a second image sensor based on the first exposure timing, wherein capture of the second image by the second image sensor according to the second exposure timing includes exposure of second ROI image data from the second image sensor for a second ROI exposure time period that overlaps with the first ROI exposure time period; means for receiving the first image from the first image sensor, the first image captured by the first image sensor according to the first exposure timing; and means for receiving the second image from the second image sensor, the second image captured by the second image sensor according to the second exposure timing.

In some aspects, the first ROI image data corresponds to a row of image data in the first image, and wherein the second ROI image data corresponds to a row of image data in the second image.

In some aspects, the first ROI image data depicts at least part of an object of interest in a scene, wherein the second ROI image data also depicts at least part of the object of interest in the scene. In some aspects, the methods, apparatuses, and computer-readable medium described above further comprise: identifying, using an object detection algorithm, a first depiction of at least the part of the object of interest in a third image captured by the first image sensor before capture of the first image; and identifying, using the object detection algorithm, a second depiction of at least the part of the object of interest in a fourth image captured by the first image sensor before capture of the second image. In some aspects, the methods, apparatuses, and computer-readable medium described above further comprise: receiving an input through a user interface, the input identifying the object of interest.

In some aspects, the first ROI image data includes a center of the first image, and the second ROI image data includes a center of the second image. In some aspects, the first image has a first field of view and the second image has a second field of view that differs from the first field of view.

In some aspects, setting the second exposure timing includes aligning a start of the second ROI exposure time period with a start of the first ROI exposure time period. In some aspects, setting the second exposure timing includes aligning an end of the second ROI exposure time period with an end of the first ROI exposure time period. In some aspects, setting the second exposure timing includes aligning part of the second ROI exposure time period to be contemporaneous with part of the first ROI exposure time period.

In some aspects, the methods, apparatuses, and computer-readable medium described above further comprise: identifying a distance between a device and a portion of a scene that is depicted in the first image and in the second image, wherein identifying the distance includes performing stereo matching based on the first image and the second image, wherein the device includes the first image sensor and the second image sensor.

In some aspects, the methods, apparatuses, and computer-readable medium described above further comprise: generating a merged image at least by merging the first image and the second image.

In some aspects, the methods, apparatuses, and computer-readable medium described above further comprise: one or more displays, wherein the one or more processors are configured to display the first image and the second image on the one or more displays. In some aspects, the methods, apparatuses, and computer-readable medium described above further comprise: a communication transceiver, wherein the one or more processors are configured to transmit at least one of first image and the second image using the communication transceiver.

In some aspects, the methods, apparatuses, and computer-readable medium described above further comprise: the first image sensor configured to capture the first image according to the first exposure timing; and the second image sensor configured to capture the second image according to the second exposure timing.

In some aspects, the methods, apparatuses, and computer-readable medium described above further comprise: receiving a third image from the first image sensor, the third image captured by the first image sensor according to the first exposure timing; and identifying the first exposure timing based on exposure of the third image.

In some aspects, the methods, apparatuses, and computer-readable medium described above further comprise: before setting the second exposure timing, identifying a prior second exposure timing corresponding to the second image sensor, wherein the second image sensor is configured to expose the second ROI image data for a prior second ROI exposure time period according to the prior second exposure timing; and identifying a timing difference between a start of the first ROI exposure time period and a start of a prior second ROI exposure time period, wherein setting the second exposure timing includes adjusting the prior second exposure timing to reduce the timing difference. In some aspects, setting the second exposure timing includes moving a start of exposure for the second image relative to a prior start of exposure for the second image based on the timing difference, the prior start of exposure for the second image corresponding to the prior second exposure timing. In some aspects, the methods, apparatuses, and computer-readable medium described above further comprise: receiving a fourth image from the second image sensor, the fourth image captured by the second image sensor according to the prior second exposure timing; and identifying the prior second exposure timing based on exposure of the fourth image.

In some aspects, apparatuses described above are one of a mobile device, a mobile handset, a wireless communication device, a head-mounted display, and a camera. In some aspects, the apparatuses described above further comprise: the image sensor configured to capture the image.

In some aspects, the apparatus comprises a camera, a mobile device, a mobile telephone, a smart phone, a mobile handset, a portable gaming device, a wireless communication device, a smart watch, a wearable device, a head-mounted display (HMD), an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image. In some aspects, the apparatus further includes a display for displaying the image, one or more notifications (e.g., associated with processing of the image), and/or other displayable data. In some aspects, the display displays the image after the one or more processors process the image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 6A is a conceptual diagram illustrating a comparison between a first exposure timing for a first image sensor and a second exposure timing for a second image sensor, in accordance with some examples;

DETAILED DESCRIPTION

Figure 1:
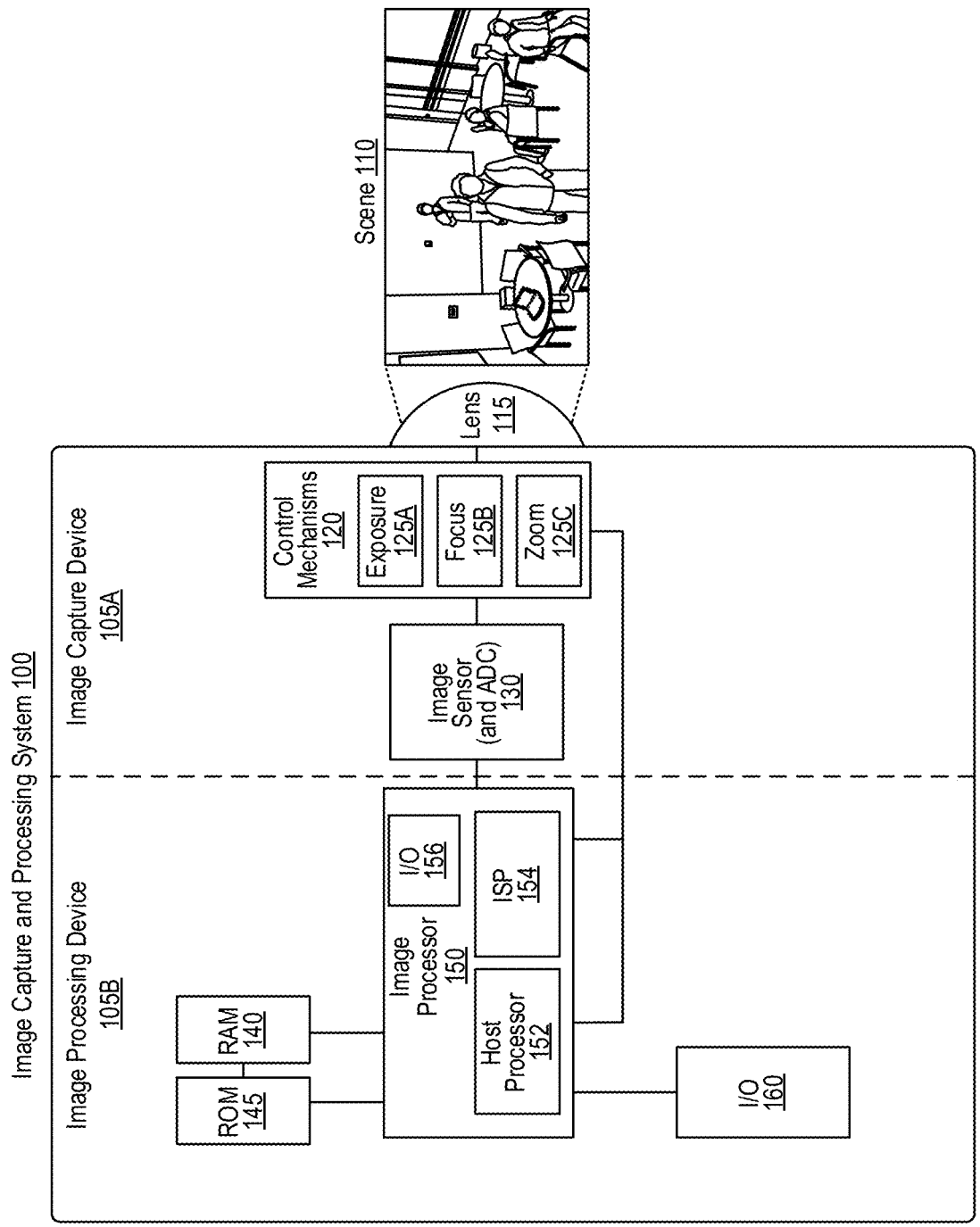
FIG. 1 is a block diagram illustrating an architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

Exposure time refers to a period of time during which an image sensor of an image capture device is exposed to light from a scene that is to be photographed by the image capture device. The image capture device can open an aperture to begin the exposure time. Light from the scene passes through the aperture to reach the image sensor. The image capture device closes the aperture to end the exposure time. Closing the aperture and ending the exposure time blocks further light from reaching the image sensor.

During the exposure time, the image capture device gradually uncovers the image sensor to begin exposure time, and gradually covers the image sensor to end the exposure time. In some examples, the image capture device reads image data signals from the image sensor to capture image data for an image of the scene upon exposure. Instead of exposing the entire image sensor all at once, cameras with rolling shutters begin exposure of different rows sequentially. For example, image capture device can gradually uncover the image sensor, from the top of the image sensor to the bottom of the image sensor, to begin exposure time sequentially row-by-row from a top row to a bottom row. Similarly, the image capture device can gradually cover the image sensor, from the top of the image sensor to the bottom of the image sensor, to end exposure time sequentially row-by-row from the top row to the bottom row. In some examples, the image capture device also reads image data signals from the image sensor row-by-row, from the top row to the bottom row, for example after exposure ends for each row. In some examples, the image capture device also reads image data signals from the image sensor from left-to-right within the row. In some examples, the image capture device can expose the image sensor and/or read the image data signals from the image sensor from the top row to the bottom row. In such examples, the bottom of the resulting image depicts the scene at a slightly later point in time than the top of the image does. In some examples, the image capture device can expose the image sensor and/or read the image data signals from the image sensor from the bottom row to the top row. In such examples, the top of the resulting image depicts the scene at a slightly later point in time than the bottom of the image does. In some examples, the image capture device can expose the image sensor and/or read the image data signals within each row from left to right. In such examples, the right side of a row of the resulting image depicts the scene at a slightly later point in time than the left side of the row of the image does. In some examples, the image capture device can expose the image sensor and/or read the image data signals within each row from right to left. In such examples, the left side of a row of the resulting image depicts the scene at a slightly later point in time than the right side of the row of the image does.

Some devices can use two image capture devices to capture two images of the same scene. In one illustrative example, an imaging system can capture a left-side stereoscopic image of a scene using a first image sensor and a right-side stereoscopic image of the scene using a second image sensor. For instance, the imaging system can be an extended reality (XR) system, such as a virtual reality (VR) system, an augmented reality (AR) system, a mixed reality (MR) system, or a combination thereof. In another example, an imaging system can capture two images of the same scene with different zoom levels and/or fields of view. For instance, the imaging system can use two image sensors with different lenses that provide different zoom levels or fields of view. For instance, the lenses can include a telephoto lens, a non-telephoto lens, a zoom lens, a non-zoom lens, a wide-angle lens, an ultra-wide angle lens, a fisheye lens, a non-wide-angle lens, or a combination thereof.

Differences in image sensor exposure times can cause the two images to depict the same region of interest (ROI) at slightly different points in time. In some examples, the ROI in the two images can represent the centers of the two images. In some examples, the ROI in the two images can represent regions in the two images at which a particular person or object of interest is depicted. For instance, if the ROI in the two images represents regions in the two images at which a person of interest is depicted, then the depiction of the person in the first image can depict the person as the person appeared at a first point in time, while the depiction of the person in the second image can depict the person as the person appeared at a second point in time. Regardless of what type of ROI is used, this asynchrony in depictions of the ROI in images of the scene can cause errors in operations that involve both images, such as detection of depth to a point in the scene depicted in the images using stereo matching, depth mapping of the scene depicted in the images, inserting virtual content into the scene depicted in the images (e.g., as in XR), merging of the two images together into a combined image, display of the two images to the user's left and right eyes to provide the user with stereoscopic vision of the scene, or combinations thereof. This asynchrony in depictions of the ROI in the two images may occur even if the two images are captured contemporaneously, for example if the exposure times for capturing the two images differ, if the zoom strengths for the two images differ, if the two images are captured using different types of lenses, if the two images are captured at different resolutions, if the two images are captured using image sensors with one or more image sensor properties that differ, if the ROI appears in a different position in one of the images in than the other, or a combination thereof.

Imaging systems and techniques are described herein that perform automatic image capture synchronization to reduce, mitigate, or eliminate asynchrony between depictions of the same region of interest in two or more different images of the same scene captured by two or more different image sensors. The automatic image capture synchronization can reduce, mitigate, or eliminate errors that would otherwise be caused by such asynchrony. An example imaging system includes two or more image sensors, including a first image sensor and a second image sensor. In some examples, the imaging system can include more than two image sensors. The first image sensor is configured to, and can, capture a first image of a scene according to a first exposure timing. Capture of the first image by the first image sensor can include exposure of first region of interest (ROI) image data at the first image sensor for a first ROI exposure time period. The first ROI image data can include at least a part of a region of the scene (e.g., that depicts a specific object), a region of the image (e.g., a center of the image), or both. In some examples, the first ROI image data can include one or more rows of image data from the first image.

Based on the first exposure timing, the imaging system can set a second exposure timing for a second image sensor to capture a second image of the scene. The second image sensor is configured to, and can, capture the second image of the scene according to the second exposure timing. Capture of the second image by the second image sensor can include exposure of second ROI image data at the second image sensor for a second ROI exposure time period. The second ROI image data can depict at least a part of a region of the scene as depicted in the second image (e.g., an object or individual detected in the scene), a region of the second image (e.g., a center of the second image), or both. In some examples, the second ROI image data can include one or more rows of image data from the second image. The first ROI image data and the second ROI image data can depict the same region of the same scene (e.g., the same individual or object) and/or the same image region (e.g., the centers of the first and second images respectively).

The second exposure timing may be set so that at least one part (e.g., start and/or end) of the second ROI exposure time period aligns with at least one part (e.g., start and/or end) of the first ROI exposure time period. The second exposure timing may be set so that the first exposure times overlaps with the second exposure time. Aligning the part of the second ROI exposure time period with the part of the first ROI exposure time period can reduce or eliminate asynchrony between the first ROI image data in the first image and the second ROI image data in the second image. According to the first exposure timing and the second exposure timing, exposure of first ROI image data from the first image sensor and the exposure of the second ROI image data from the second image sensor can start contemporaneously and/or be overlapping. In an illustrative example, if the imaging system begins exposure of first ROI image data from the first image sensor at a first ROI exposure time and begins exposure of second ROI image data from the second image sensor at a second ROI exposure time, the first ROI exposure time and the second ROI exposure time can be synchronized according to the first exposure timing and the second exposure timing. Contemporaneous exposure, capture, and/or readout of the first ROI image data and the second ROI image data can reduce or eliminate asynchrony between representations of the ROI in the first image and the second image. For example, if the ROI in the two images represents regions in the two images at which a person of interest is depicted, then the depiction of the person in the first image and the depiction of the person in the second image can both depict the person as the person appeared at a shared point in time and/or a shared period of time.

The imaging system can set the second exposure timing by adjusting a prior second exposure timing, for instance by moving (e.g., postponing or preponing) or otherwise adjusting the prior second exposure timing. For example, according to the prior second exposure timing, there may have been a sufficiently large timing difference (e.g., greater than a threshold timing difference) between the start of exposure of the first ROI image data from the first image sensor and the start of exposure of the second image data corresponding to the ROI from the second image sensor. The imaging system can identify the timing difference between a first timing of the start of exposure of the first ROI image data from the first image sensor according to the first exposure timing and a second timing of the start of exposure of second ROI image data from the second image sensor according to the prior second exposure timing. The imaging system can determine that the timing difference exceeds a timing difference threshold, and can move or otherwise adjust the prior second exposure timing to set the second exposure timing.

The first image sensor can capture the first image according to the first exposure timing. The imaging system can receive the first image from the first image sensor. The second image sensor can capture the second image according to the second exposure timing. The imaging system can receive the second image from the second image sensor. The imaging system can output the first image, the second image, or a combination thereof. For instance, the imaging system can display, on one or more displays of the imaging system, the first image, the second image, or a combination thereof. The imaging system can transmit, using a communication interface, the first image, the second image, or a combination thereof. The imaging system can use the first image and the second image for performing stereo matching, scene mapping, identification of a distance between the imaging system and a part of the scene, feature extraction of a feature in the scene, feature tracking of a feature in the scene, feature mapping of a feature in the scene (e.g., identifying 3D coordinates of the feature in the scene), localization (or relocalization) of the imaging system within the scene, pose estimation of the imaging system within the scene, various visual simultaneous localization and mapping (VSLAM) operations, combining virtual content into representations of the scene, various extended reality (XR) options, or combinations thereof. The imaging system can identify a distance between the imaging system and a part of the scene by performing stereo matching using the first image and the second image.

The systems and techniques described herein provide technical improvements to imaging technologies with multiple image sensors (e.g., multiple image capture devices or cameras). For instance, the imaging systems and techniques described herein allow exposure timings for multiple image sensors to by synchronized so that a ROI is depicted at the same point in time in each of the multiple images captured by the multiple image sensors. This prevents asynchrony between the ROI as depicted in the multiple images. For instance, the synchronization can preventing a first depiction of the ROI in a first image and a second depiction of the ROI in a second image to depict the ROI at different times due to being exposed at different times. A timing difference may identify the difference between the exposures and/or depictions. The timing difference may be measured by units of time (e.g., one or more picoseconds, nanoseconds, or milliseconds), in a pixel offset (e.g., one or more pixels), by a pixel clock, or a combination thereof. Preventing this asynchrony can provide technical improvements such as reducing or preventing errors in stereoscopic depth mapping, reducing or preventing errors (e.g., ghosting) in merging of at least a subset of the images together, reducing or preventing errors in stereoscopic displays (e.g., in XR systems) that could cause nausea or visual discord in users, or a combination thereof. Preventing this asynchrony can also increase efficiency in multi-camera systems, since two images that might otherwise have to be processed for their depictions of a shared ROI to align do not have to undergo such processing, as the synchronization aligns the depictions of the shared ROI in the images.

For example, multiple images captured by the multiple image sensors can depict a scene with an object of interest. The imaging systems and techniques described herein can allow exposure timings for the multiple image sensors to by synchronized so that the object of interest in the scene is exposed and/or captured at the same moment in time in each of the multiple images captured by the multiple image sensors. The imaging systems and techniques described herein allow the depictions of the object of interest in the multiple images to depict the object of interest as it appeared at a same moment in time in the real world. If the object of interest is fast-moving, such as a vehicle, an animal, a projectile, or a human being, then depictions of the object of interest at even slightly different points in time may differ noticeably in positon and/or pose of the object of interest. Such timing differences, which might cause errors, can be reduced or eliminated using the imaging systems and techniques described herein.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. In some examples zoom setting may include a digital zoom setting. In some examples, the zoom setting may include an optical zoom setting. Based on the zoom setting, the zoom control mechanism 125C can control which of a set of cameras is active, a focal length of an assembly of lens elements (lens assembly) that includes the lens 115 and/or one or more additional lenses, or a combination thereof. For example, the zoom control mechanism 125C can control the focal length of the lens assembly by actuating one or more motors or servos of the zoom control mechanism 125C to move one or more of the lenses relative to one another. The zoom setting may be referred to as an image capture setting and/or an image processing setting.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1010 discussed with respect to the computing system 1000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or RAM 1020, read-only memory (ROM) 145 and/or ROM 1025, a cache, a memory unit, another storage device, or some combination thereof.

Various input/output (I/O) devices 160 may be connected to the image processor 150. The I/O devices 160 can include a display (or display screen), a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing system coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing system, such as a mobile handset, a desktop computer, or other computing system.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
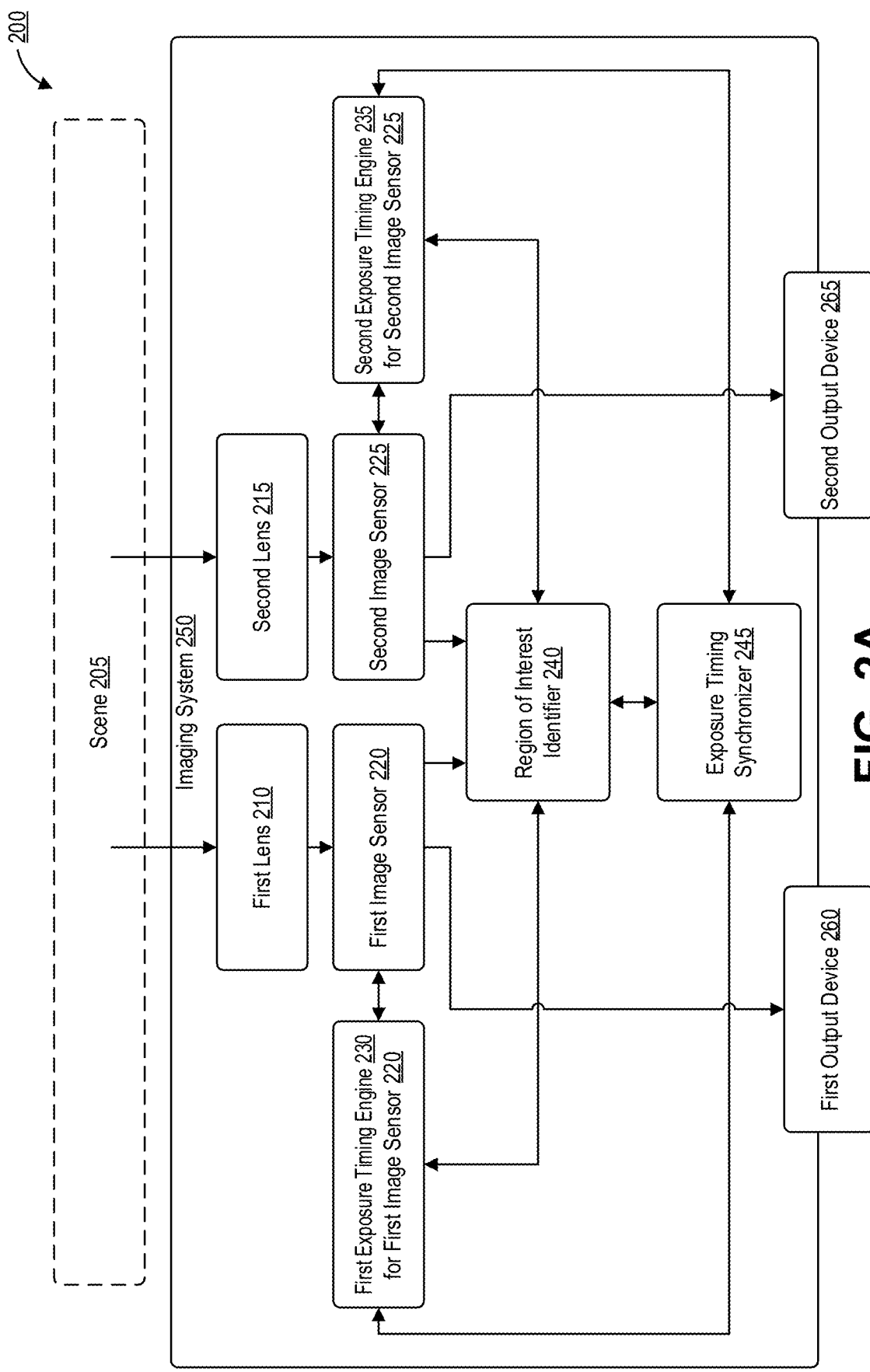
FIG. 2A is a block diagram illustrating an architecture of an imaging system that synchronizes exposure timings for a first image sensor and a second image sensor, in accordance with some examples.

FIG. 2A is a block diagram 200 illustrating an architecture of an imaging system 250 that synchronizes exposure timings for a first image sensor 220 and a second image sensor 225. The imaging system 250 includes multiple image sensors, including a first image sensor 220 and a second image sensor 225. The first image sensor 220 and the second image sensor 225 receive light from the same scene 205. The first image sensor 220 receives light from the scene 205 through a first lens 210. The second image sensor 225 receives light from the scene 205 through a second lens 215. The scene 205 of FIG. 2A may be an example of the scene 110 of FIG. 1. The first image sensor 220 and the second image sensor 225 of FIG. 2A may be examples of the image sensor 130 of FIG. 1, and/or vice versa. The first lens 210 and the second lens 215 of FIG. 2A may be examples of the lens 115 of FIG. 1, and/or vice versa.

In some examples, the first image sensor 220 has the same image sensor properties as the second image sensor 225. In some examples, the first image sensor 220 has one or more different image sensor properties compared to the second image sensor 225. Image sensor properties can include size, resolution, dynamic range, signal-to-noise ratio, low-light sensitivity, color separation (e.g., color filtering), sensor type (e.g., CCD, CMOS, or hybrid), which spectra of electromagnetic radiation an image sensor is sensitive to (e.g., visible light, infrared, ultraviolet, microwave, radio, X-ray, and/or gamma), sensor curvature, or combinations thereof.

In some examples, the first lens 210 has the same lens properties as the second lens 215. In some examples, the first lens 210 has one or more different lens properties compared to the second lens 215. Lens properties can include curvature (e.g., biconvex, plano-convex, positive meniscus, negative meniscus, plano-concave, biconcave, convex-concave, concave-convex, planar), focal length, refractive index, radius of curvature of the lens surface closer to the scene 205, radius of curvature of the lens surface farther from the scene 205, focus, thickness (e.g., distance along the lens axis between the two surface vertices of the lens), optical power, magnification, zoom, spherical aberration, coma, chromatic aberration, field curvature, barrel distortion, pincushion distortion, other radial distortion, other distortion, astigmatism, other aberrations, aperture diffraction, achromat, compound lensing, aspherical lensing, Frensel lensing, lenticular lensing, bifocal lensing, gradient index, axicon lensing, diffraction, optical coatings, anti-fogging treatment, polarization, or combinations thereof. In some examples, the first lens 210 and/or the second lens 215 can be a telephoto lens. In some examples, the first lens 210 and/or the second lens 215 can be a zoom lens. In some examples, the first lens 210 and/or the second lens 215 can be a wide-angle lens. In some examples, the first lens 210 and/or the second lens 215 can be an ultra-wide-angle lens. In some examples, the first lens 210 and/or the second lens 215 can be a fisheye lens.

In some examples, the first image sensor 220 of the imaging system 250 can capture a left-side stereoscopic image of the scene 205 while the second image sensor 225 of the imaging system 250 can capture a right-side stereoscopic image of the scene 205. In some examples, the first image sensor 220 of the imaging system 250 can capture a right-side stereoscopic image of the scene 205 while the second image sensor 225 of the imaging system 250 can capture a left-side stereoscopic image of the scene 205. For instance, the imaging system can be an extended reality (XR) system, such as a virtual reality (VR) system, an augmented reality (AR) system, a mixed reality (MR) system, or a combination thereof.

The imaging system 250 can include a region of interest (ROI) identifier 240. The ROI identifier 240 can identify a ROI in a first image captured by the first image sensor 220. The ROI identifier 240 can identify a ROI in a second image captured by the second image sensor 225. In a first illustrative example, the ROI identifier 240 can identify, as an ROI in the two images, the centers of the two images. In this example, the ROI identifier 240 can identify the center of the first image and can identify the center of the second image. In a second illustrative example, the ROI identifier 240 can identify, as an ROI in the two images, regions in the two images at which a particular person of interest, object of interest, and/or feature of interest is depicted. In this example, the ROI identifier 240 can identify a depiction of the person, object, and/or feature of interest in the first image. In this example, the ROI identifier 240 can identify a depiction of the person, object, and/or feature of interest in the second image. The ROI identifier 240 can identify a depiction of the person of interest, object of interest, and/or feature of interest in an image using feature detection, feature recognition, feature tracking, object detection, object recognition, object tracking, vehicle detection, vehicle recognition, vehicle tracking, facial detection, facial recognition, facial tracking, person detection, person recognition, person tracking, animal detection, animal recognition, animal tracking, or a combination thereof.

In some examples, the ROI can be a point of interest (POI). The POI can be a point relative to the images themselves, such as center points of the images. The POI can be a point relative to depictions of a person, object, and/or feature of interest in the scene. For example, the POI can be a point at the top of a person's head in a depiction of the person, a point corresponding to a person's eye in a depiction of the person, point corresponding to a person's nose tip in a depiction of the person, or another specified point along a depiction of a person, object, and/or feature of interest in the scene. An ROI can be an area around a POI, such as a circle around a POI having a radius of a predetermined length or a polygon around a POI having a predetermined number of sides that each have predetermined lengths. While the ROI identifier 240 is illustrated as a single component in FIG. 2A, the imaging system 250 can in some examples include a first ROI identifier that identifies the ROI in image(s) from the first image sensor 220 and a second ROI identifier that identifies the ROI in image(s) from the second image sensor 225.

Figure 4A:
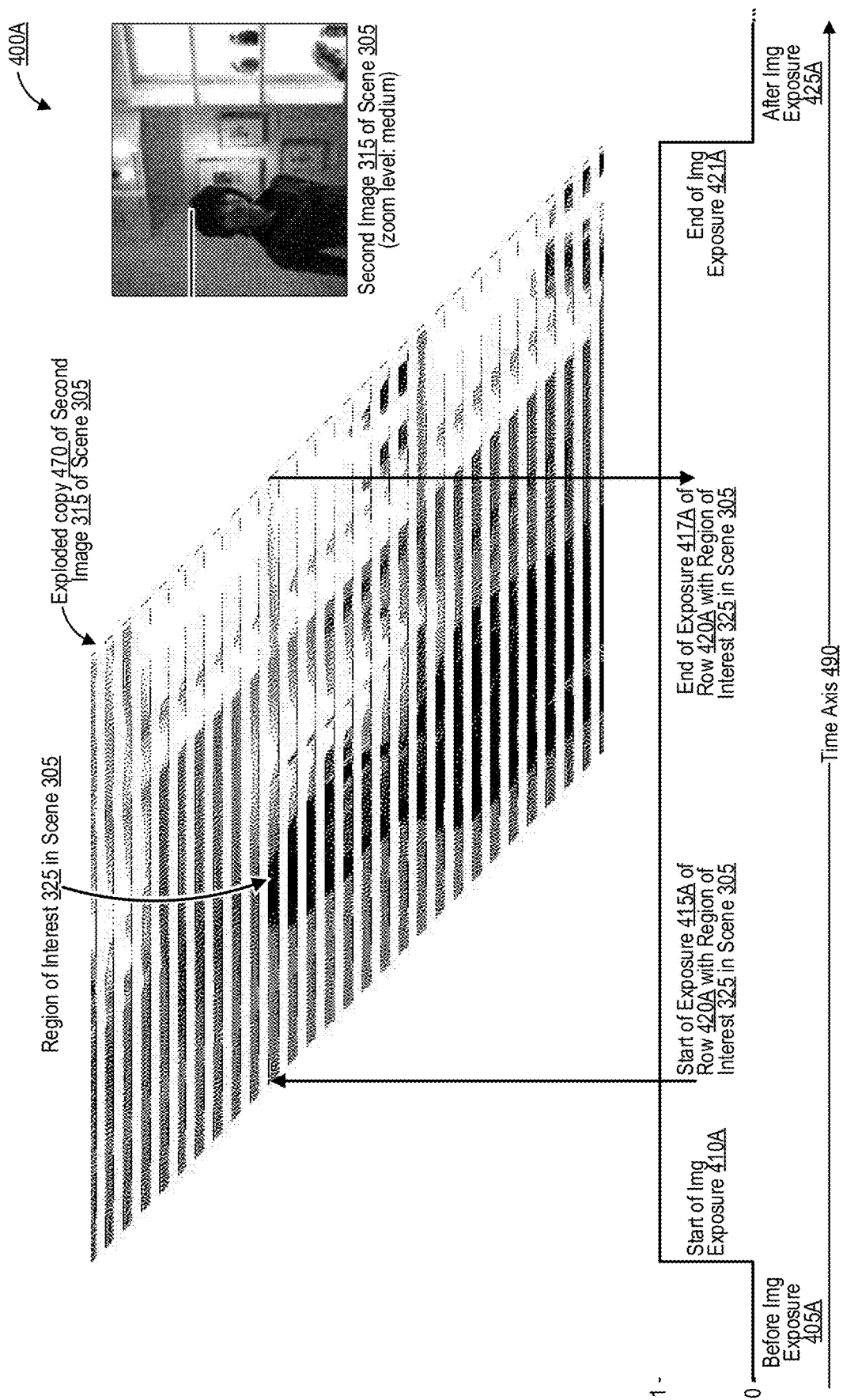
FIG. 4A is a conceptual diagram illustrating a representation of an exposure timing for the second image of the scene having a medium zoom level captured using a rolling shutter, in accordance with some examples.
Figure 4B:
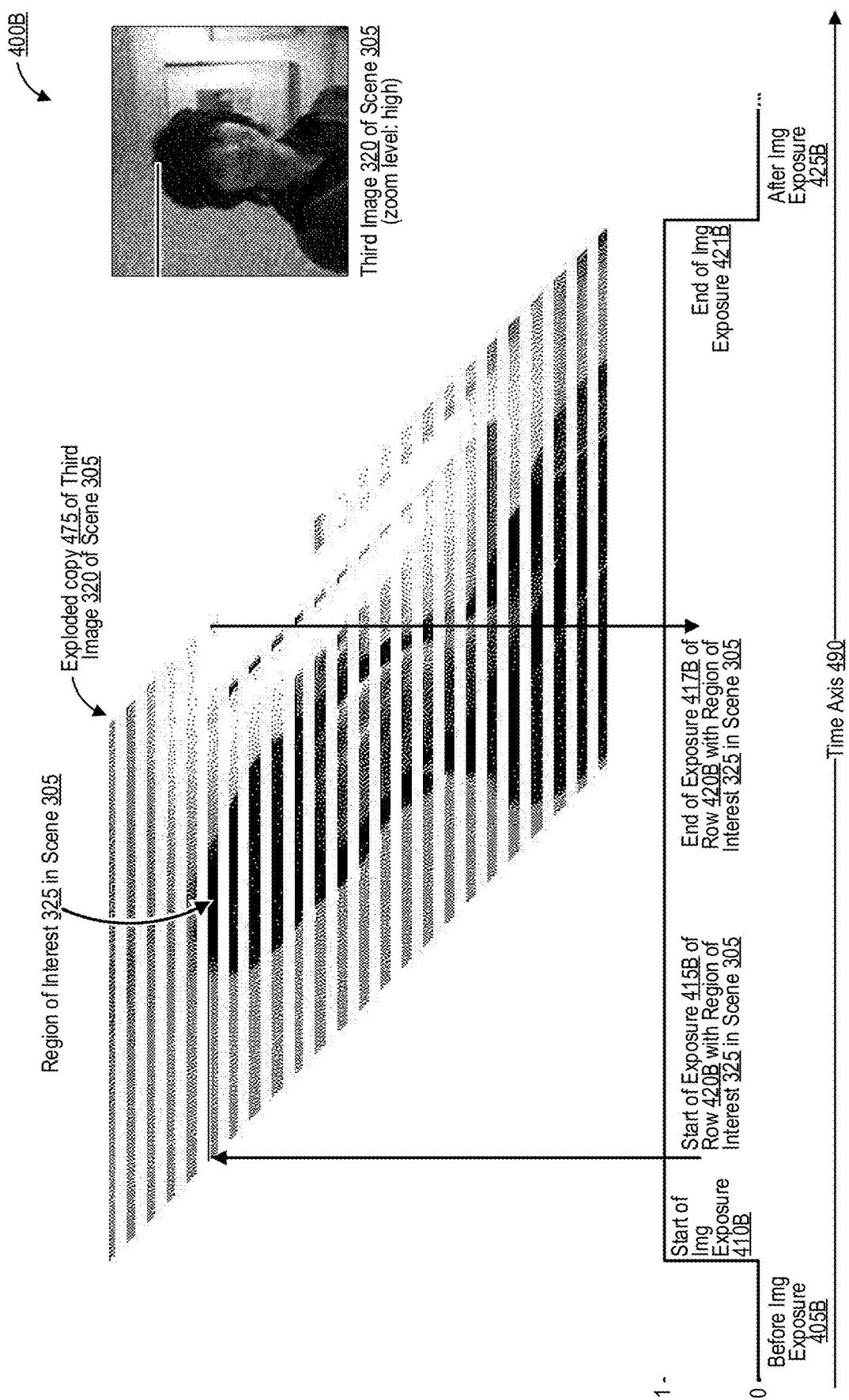
FIG. 4B is a conceptual diagram illustrating a representation of an exposure timing for the third image of the scene having a high zoom level captured using a rolling shutter, in accordance with some examples.

The imaging system 250 can include a first exposure timing engine 230 for the first image sensor 220. The imaging system 250 can include a second exposure timing engine 235 for the second image sensor 225. The first exposure timing engine 230 can identify and/or set a first exposure timing for the first image sensor 220, in some cases in coordination with the exposure timing synchronizer 245. The second exposure timing engine 235 can identify and/or set a second exposure timing for the second image sensor 225, in some cases in coordination with the exposure timing synchronizer 245. An exposure timing for an image can identify a timing (e.g., a point in time) for a start of image exposure (start of an exposure time) for the image and a timing (e.g., a point in time) for an end of image exposure (end of the exposure time) for the image. An exposure timing for an image can identify a timing (e.g., a point in time) for a start of exposure (start of an exposure time) for a row of image data in the image and a timing (e.g., a point in time) for an end of exposure (end of the exposure time) for the row of image data in the image. Examples of an exposure timing for a single image are illustrated in FIG. 4A and FIG. 4B.

Figure 2B:
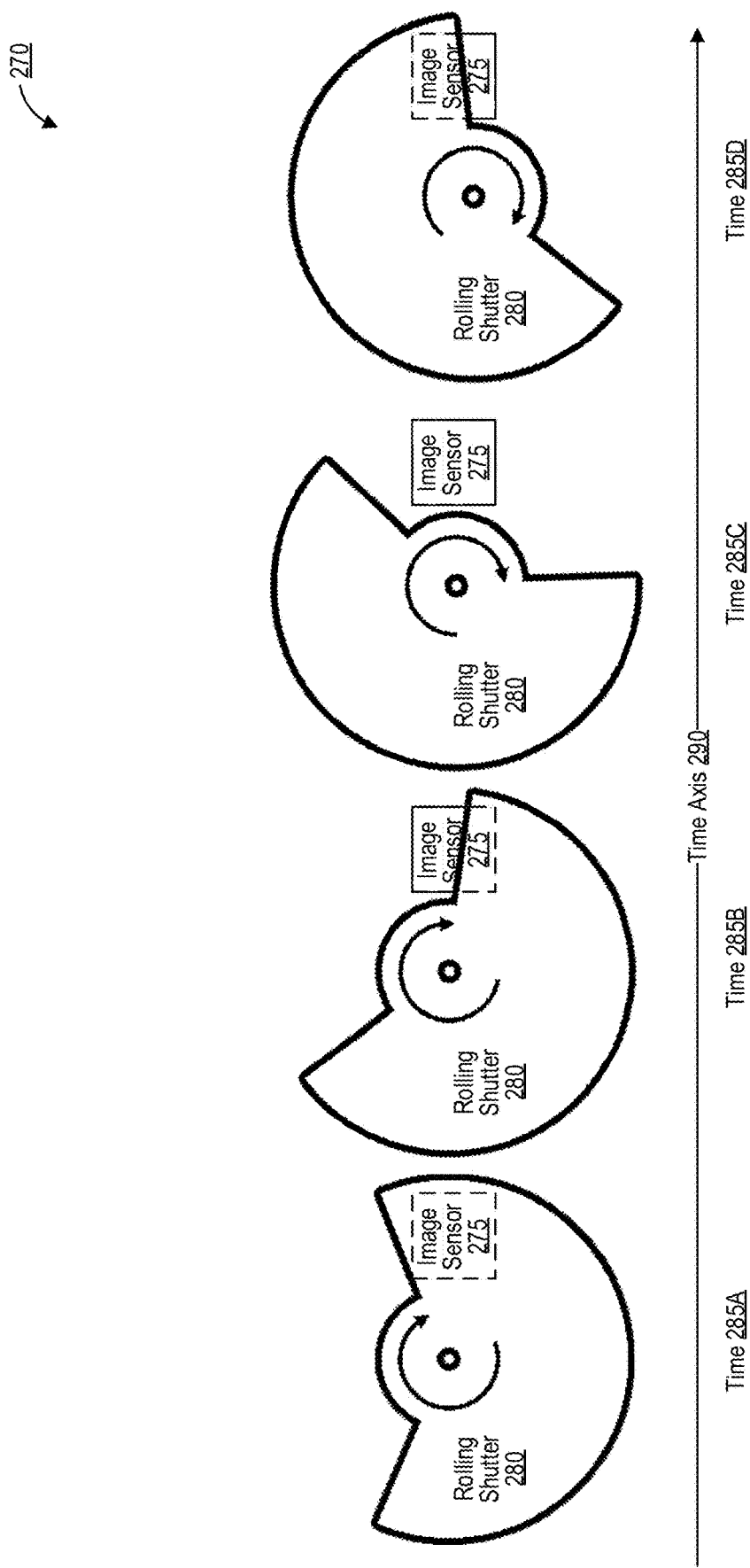
FIG. 2B is a conceptual diagram illustrating exposure of an image sensor of an imaging system using a rolling shutter, in accordance with some examples.

To start an exposure time for an image of the scene 205, the imaging system 250 can begin exposure of the image sensor of the image sensors 220-225 to light by opening an aperture or shutter, allowing the light to reach the image sensor. To end the exposure time for the image of the scene 205, the imaging system 250 can end exposure of the image sensor of the image sensors 220-225 to light by closing an aperture or shutter, blocking the light from reaching the image sensor. The exposure of the image sensor may be gradual, as illustrated in FIG. 2B, FIG. 4A, and FIG. 4B. The rolling shutter 280 of FIG. 2B may be an example of the aperture or shutter. The imaging system 250 can expose the image sensor to light from the scene one or more rows (of pixels and/or photodiodes) at a time. In some examples, the imaging system 250 can expose the image sensor to light from the scene from the top row to the bottom row. Such top-to-bottom exposure can cause the bottom of the resulting image to depict the scene 205 at a slightly later point in time than the top of the image does. In some examples, the imaging system 250 can expose the image sensor to light from the scene from the bottom row to the top row. Such bottom-to-top exposure can cause the top of the resulting image to depict the scene 205 at a slightly later point in time than the bottom of the image does.

Differences in image sensor exposure times can cause a first image of the scene 205 captured by the first image sensor 220 and a second image of the scene 205 captured by the second image sensor 225 to depict the same ROI at slightly different points in time. As noted above, the ROI in the two images can represent the centers of the two images, regions in the two images at which a particular person or object or feature of interest is depicted, another type of ROI, or a combination thereof. For instance, the depiction of the ROI in the first image captured by the first image sensor 220 can depict the ROI as the ROI appeared during first ROI exposure time period during which the one or more rows of the first image depicting the ROI were exposed. The depiction of the ROI in the second image captured by the second image sensor 225 can depict the ROI as the ROI appeared during at a second ROI exposure time period during which the one or more rows of the second image depicting the ROI were exposed. Even if the start of exposure for the first image as a whole aligns with the start of exposure for the second image as a whole, the start of exposure for the first ROI image data depicting the ROI in the first image may not align with the start of exposure for the second ROI image data depicting the ROI in the second image. Examples of such ascynchrony are highlighted as the time difference 505 of FIG. 5, the time difference 605 of FIG. 6A, and the time difference 805 of FIG. 8A.

Regardless of what type of ROI is used, this asynchrony in depictions of the ROI in the two images of the scene 205 can cause errors in operations performed by the imaging system 250 or an external device that receives and uses the images from the imaging system 250. For instance, the asynchrony in depictions of the ROI in the two images of the scene 205 can cause errors in detection of depth to a point in the scene 205 (distance between the imaging system 250 and the point in the scene 205) depicted in the images using stereo matching, depth mapping of the scene 205 depicted in the images, inserting virtual content into the scene 205 depicted in the images (e.g., as in XR), merging of the two images together into a combined image, display of the two images to the user's left and right eyes to provide the user with stereoscopic vision of the scene 205, or combinations thereof. This asynchrony in depictions of the ROI in the two images may occur even if the two images are captured contemporaneously, for example if the image exposure time periods (shutter speeds) for exposing and/or capturing the two images (in their entireties) differ (e.g., as in FIGS. 8A-8C), if the zoom strengths for the two images differ (e.g., as in FIGS. 4A-4B, FIG. 5, and FIGS. 6A-6C), if the two images are captured using different types of lenses, if the two images are captured at different resolutions, if the two images are captured at different fields of view, if the two images are captured using image sensors 220-225 with one or more image sensor properties that differ, if the two images are captured using lenses 210-215 with one or more lens properties that differ, if the ROI appears in a different position in one of the images in than the other, or a combination thereof.

In some examples, the first exposure timing engine 230 identifies a first exposure timing for the first image sensor 220. The first exposure timing for the first image sensor 220 can identify an exposure time for one or more images to be captured by the first image sensor 220. The imaging system 250 is configured to, and can, capture a first image of a scene 205 using the first image sensor 220 according to a first exposure timing. Capture of the first image using the first image sensor 220 can include exposure, by the imaging system 250, of first ROI image data at the first image sensor 220 for a first ROI exposure time period. In some examples, the first exposure timing may identify the start time and/or the end time of the first ROI exposure time period. In some examples, the start time and/or the end time of the first ROI exposure time period may be estimated based on the first exposure timing (e.g., based on the shutter speed). In some examples, the imaging system 250 may read out the first ROI image data from the first image sensor 220 during and/or after the exposure time for the first image according to a first exposure timing for the first image sensor 220.

The imaging system 250 may include an exposure timing synchronizer 245. The exposure timing synchronizer 245 can identify a first ROI exposure time period at which the imaging system 250 exposes of first ROI image data from the first image sensor 220 according to the first exposure timing, a start time thereof, an end time thereof, or a combination thereof. Based on this (and/or the first exposure timing generally), the exposure timing synchronizer 245 and/or the second exposure timing engine 235 can set a second exposure timing for a second image sensor 225 to expose and/or capture a second image of the scene 205. The imaging system 250 is configured to, and can, expose and/or capture the second image of the scene 205 using the second image sensor 225 according to the second exposure timing. Exposure and/or capture of the second image using the second image sensor 225 can include exposure of second ROI image data at the second image sensor 225 for a second ROI exposure time period. In some examples, the second exposure timing may identify the start time and/or the end time of the second ROI exposure time period. In some examples, the start time and/or the end time of the second ROI exposure time period may be estimated based on the second exposure timing (e.g., based on the shutter speed).

The exposure timing synchronizer 245 and/or the second exposure timing engine 235 can set the second exposure timing so that, according to the first exposure timing and the second exposure timing, at least a part of the second ROI exposure time period is aligned to, and/or contemporaneous with, at least a part of the first ROI exposure time period. For instance, the exposure timing synchronizer 245 and/or the second exposure timing engine 235 can set the second exposure timing so that the start of the second ROI exposure time period is aligned to, and/or contemporaneous with, the start of the first ROI exposure time period. The exposure timing synchronizer 245 and/or the second exposure timing engine 235 can set the second exposure timing so that the end of the second ROI exposure time period is aligned to, and/or contemporaneous with, the end of the first ROI exposure time period. The exposure timing synchronizer 245 and/or the second exposure timing engine 235 can set the second exposure timing so that the middle of the second ROI exposure time period is aligned to, and/or contemporaneous with, the middle of the first ROI exposure time period. In some examples, exposure timing synchronizer 245 and/or the second exposure timing engine 235 can determine the second ROI exposure time period based on the first ROI exposure time period, and can determine the second exposure timing based on the second ROI exposure time period and/or based on the shutter speed. In some examples, exposure timing synchronizer 245 and/or the second exposure timing engine 235 can determine the start and/or end of the second ROI exposure time period based on the start and/or end of the first ROI exposure time period, and can determine the second exposure timing based on the start and/or end of the second ROI exposure time period and/or based on the shutter speed. Contemporaneous, aligned, and/or overlapping exposure of the first ROI image data at the first image sensor 220 and of the second ROI image data at the second image sensor 225 can reduce or eliminate asynchrony between representations of the ROI in the first image and the second image. For example, if the first ROI image data and the second ROI image data represent regions in the two images at which a person of interest is depicted, then the depiction of the person in the first image and the depiction of the person in the second image can both depict the person as the person appeared at a shared point in time.

In some examples, the exposure timing synchronizer 245 and/or the second exposure timing engine 235 can set the second exposure timing so that, according to the first exposure timing and the second exposure timing, readout of first ROI image data from the first image sensor 220 by the imaging system 250 and the readout of the second ROI image data from the second image sensor 225 by the imaging system 250 are contemporaneous. In an illustrative example, if the imaging system 250 reads out of first ROI image data from the first image sensor 220 at the first ROI readout time and reads out of second ROI image data from the second image sensor 225 at a second ROI readout time, the first ROI readout time and the second ROI readout time can be synchronized according to the first exposure timing and the second exposure timing. Contemporaneous, aligned, and/or overlapping readout of the first ROI image data from the first image sensor 220 and of the second ROI image data from the second image sensor 225 can reduce or eliminate asynchrony between representations of the ROI in the first image and the second image. For example, if the first ROI image data and the second ROI image data represent regions in the two images at which a person of interest is depicted, then the depiction of the person in the first image and the depiction of the person in the second image can both depict the person as the person appeared at a shared point in time.

Figure 6B:
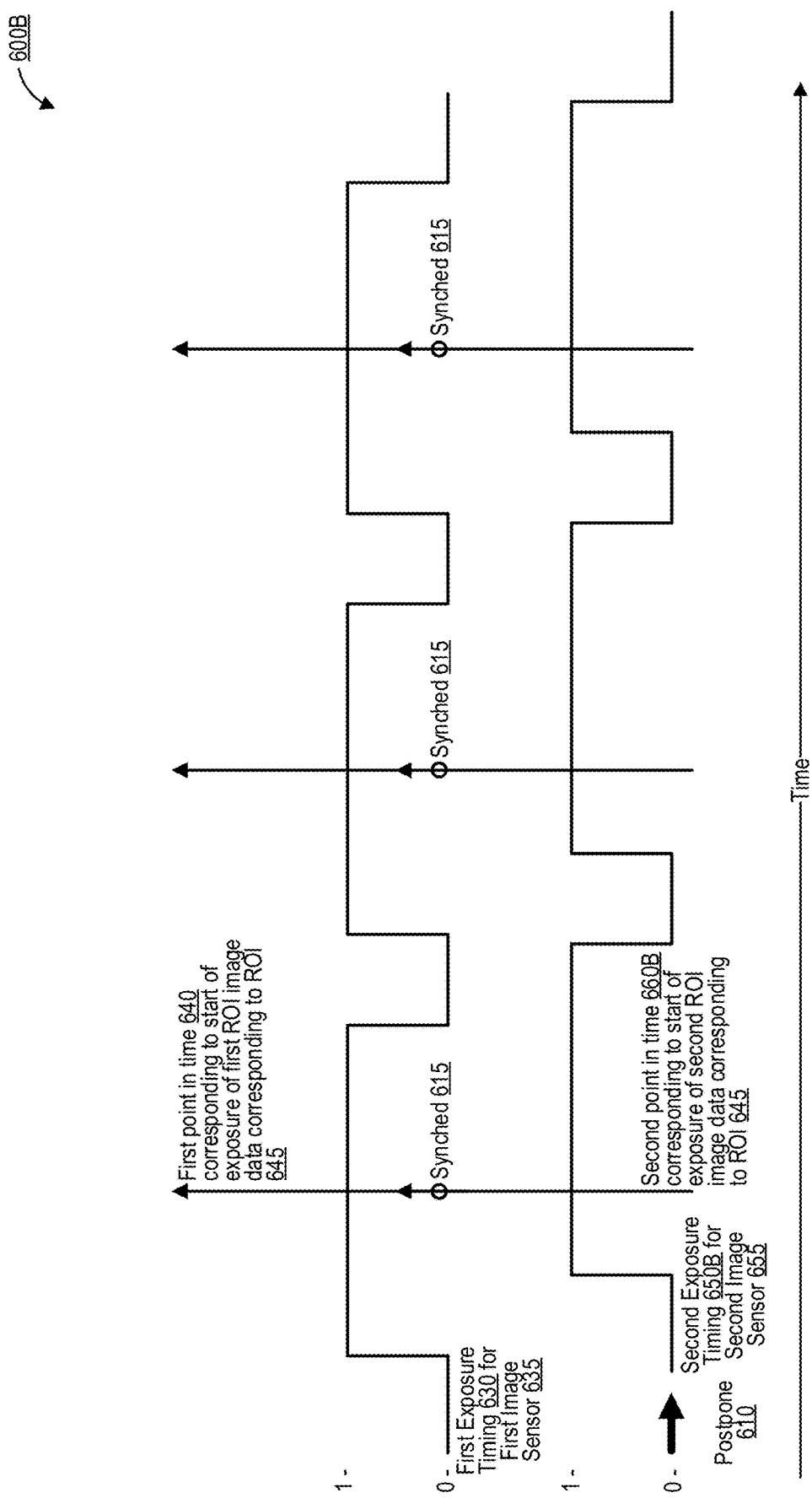
FIG. 6B is a conceptual diagram illustrating the first exposure timing of FIG. 6A and a second exposure timing that is postponed compared to the second exposure timing of FIG. 6A, in accordance with some examples.
Figure 6C:
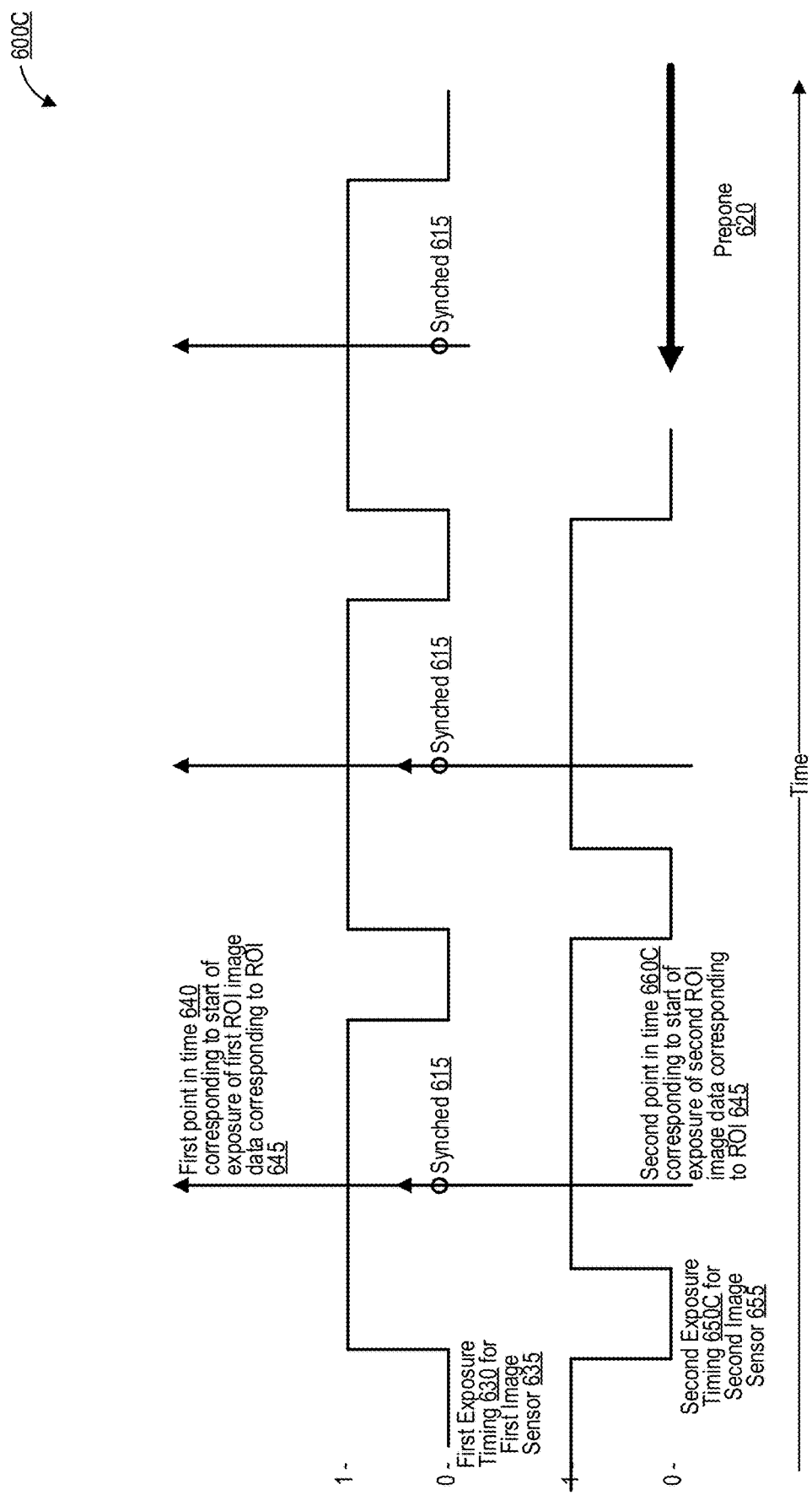
FIG. 6C is a conceptual diagram illustrating the first exposure timing of FIG. 6A and a second exposure timing that is preponed compared to the second exposure timing of FIG. 6A, in accordance with some examples.
Figure 8A:
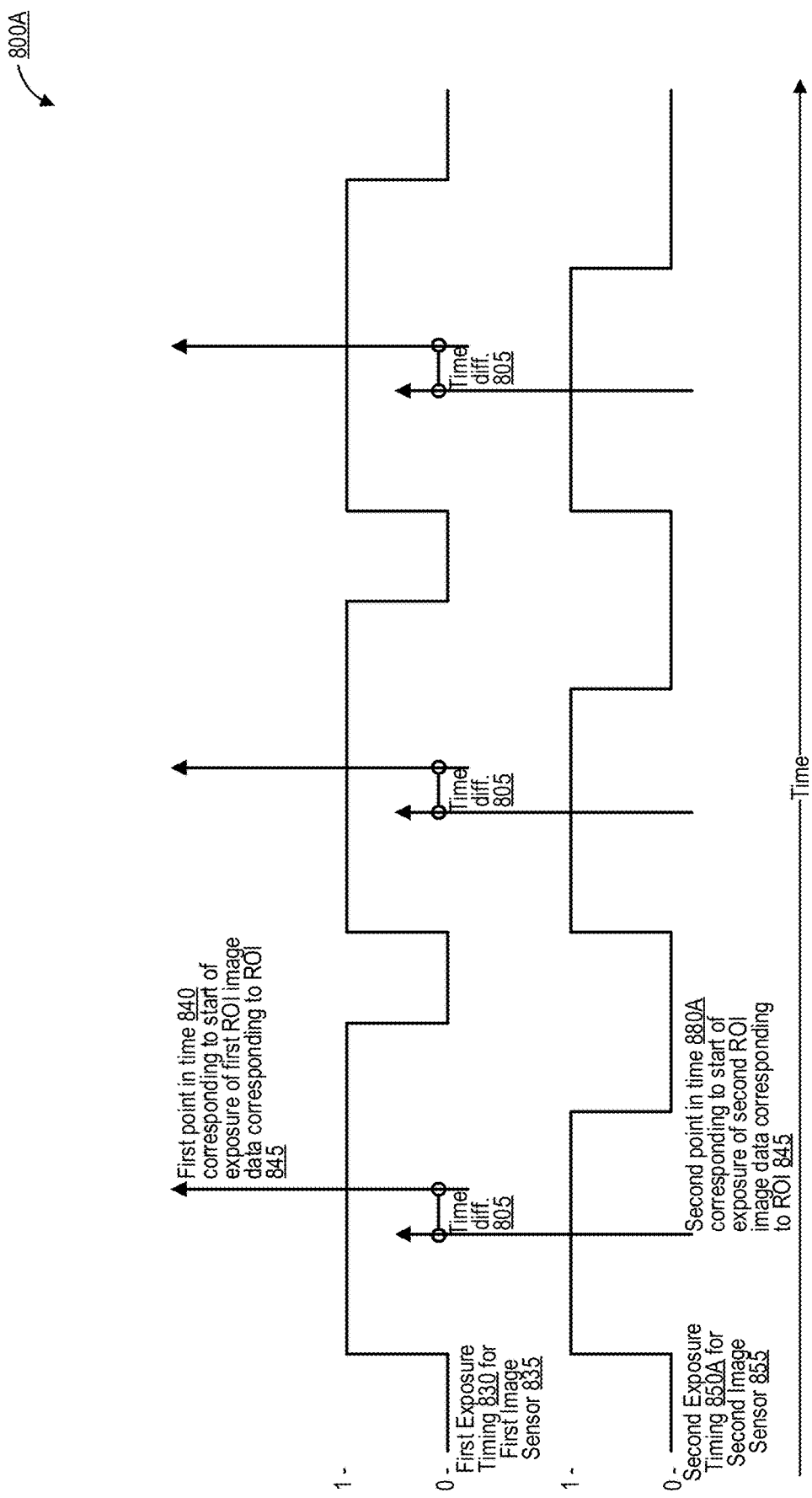
FIG. 8A is a conceptual diagram illustrating a comparison between a first exposure timing for a first image sensor and a second exposure timing for a second image sensor, in accordance with some examples.
Figure 8B:
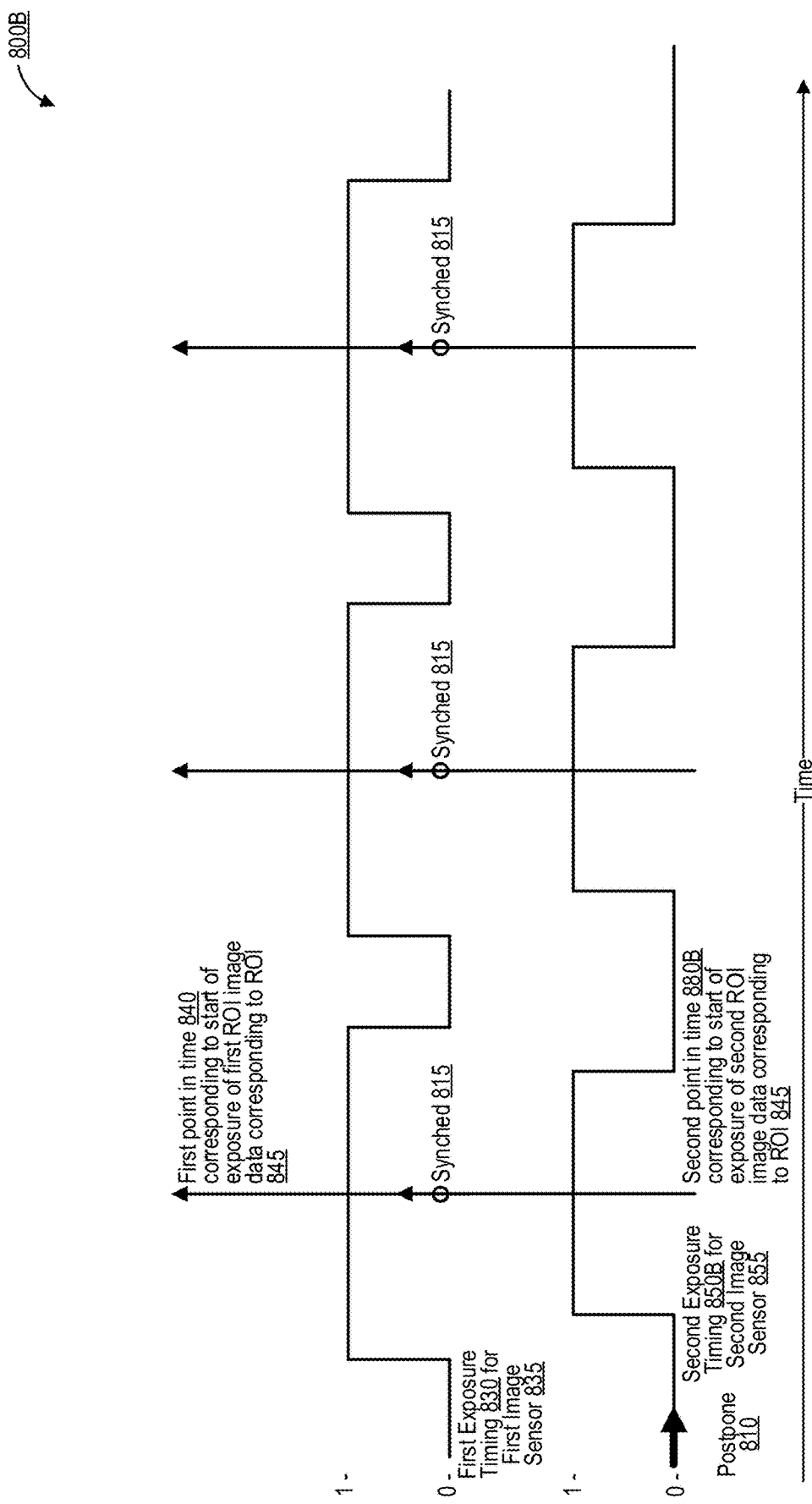
FIG. 8B is a conceptual diagram illustrating the first exposure timing of FIG. 8A and a second exposure timing that is postponed compared to the second exposure timing of FIG. 8A, in accordance with some examples.
Figure 8C:
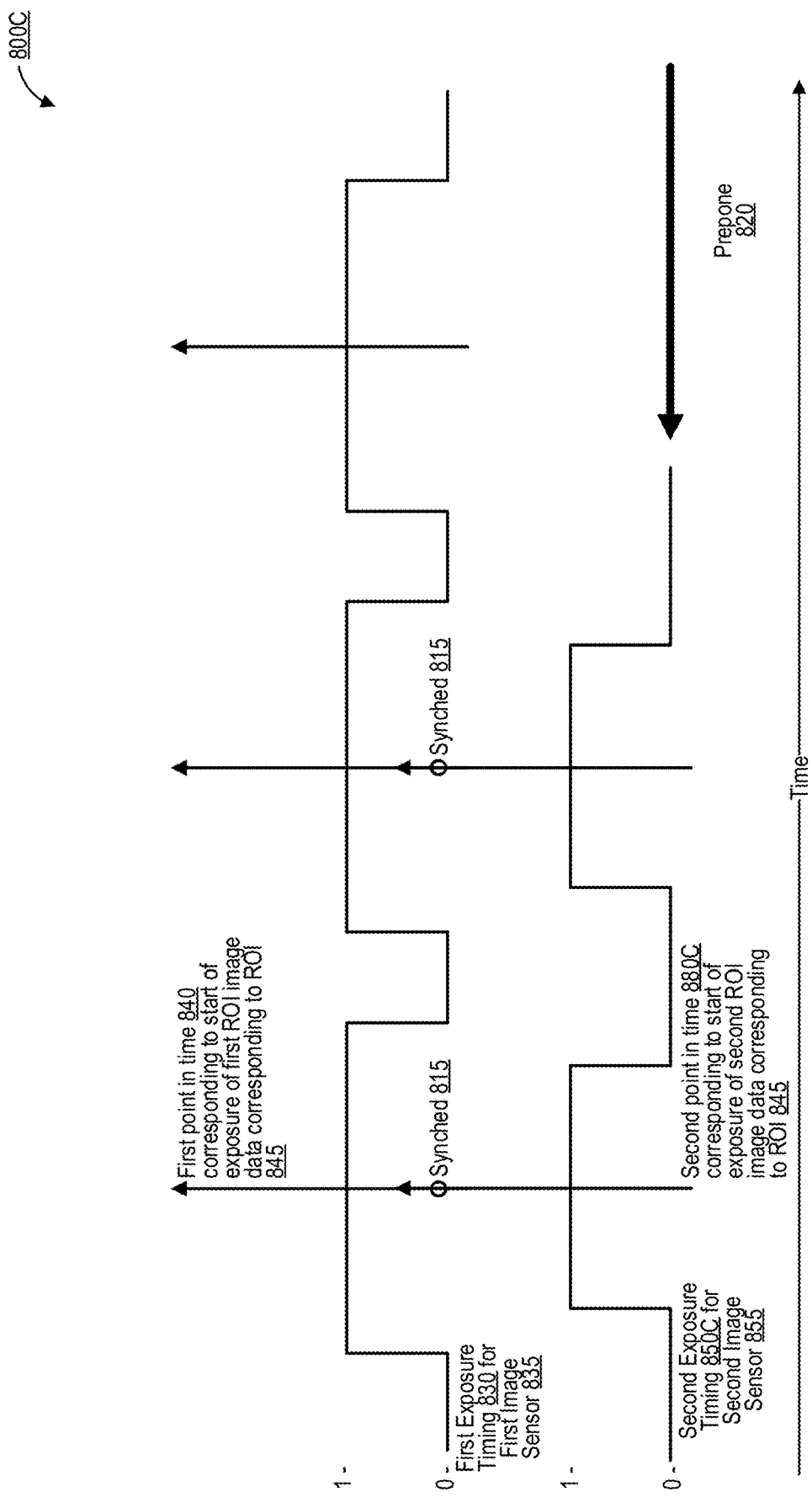
FIG. 8C is a conceptual diagram illustrating the first exposure timing of FIG. 8A and a second exposure timing that is preponed compared to the second exposure timing of FIG. 8A, in accordance with some examples.

The imaging system can set the second exposure timing by adjusting a prior second exposure timing, for instance by moving (e.g., postponing or preponing) or otherwise adjusting the prior second exposure timing. In some examples, under the prior second exposure timing, there is a sufficiently large timing difference (e.g., greater than a threshold timing difference) between the start of exposure of the first ROI image data at the first image sensor according to the first exposure timing (the start of the first ROI exposure time period) and the start of exposure of the second ROI image data at the second image sensor according to the prior second exposure timing (the start of a prior second ROI exposure time period). The imaging system can identify the timing difference between the start of the first ROI exposure time period according to the first exposure timing and the start of the prior second ROI exposure time period according to the prior second exposure timing. The imaging system can determine that the timing difference exceeds a timing difference threshold, and can move (e.g., postpone or prepone) or otherwise adjust the prior second exposure timing to set the second exposure timing. Examples of postponing a prior second exposure timing to set a second exposure timing are illustrated in FIG. 6B and FIG. 8B. Examples of preponing a prior second exposure timing to set a second exposure timing are illustrated in FIG. 6C and FIG. 8C.

In some examples, imaging system 250 includes one or more pixel clocks, one or more clocks, and/or one or more timers that the imaging system 250 may use to set, adjust, and/or synchronize the first exposure timing and the second exposure timing. For example, the exposure timing synchronizer 245 can include one or more pixel clocks, one or more clocks, and/or one or more timers that the exposure timing synchronizer 245 may use to set, adjust, and/or synchronize the first exposure timing and the second exposure timing. The first exposure timing engine 230 can include one or more pixel clocks, one or more clocks, and/or one or more timers that the first exposure timing engine 230 may use to set, adjust, and/or synchronize the first exposure timing and the second exposure timing. The second exposure timing engine 235 can include one or more pixel clocks, one or more clocks, and/or one or more timers that the second exposure timing engine 235 may use to set, adjust, and/or synchronize the first exposure timing and the second exposure timing.

The first image sensor 220 can capture the first image according to the first exposure timing. The imaging system 250 can receive the first image from the first image sensor 220. The second image sensor 225 can capture the second image according to the second exposure timing. The imaging system 250 can receive the second image from the second image sensor 225. The imaging system 250 can output the first image, the second image, or a combination thereof. In some examples, the imaging system 250 can output the first image using a first output device 260. In some examples, the imaging system 250 can output the second image using a second output device 265. While the first output device 260 and the second output device 265 are illustrated as separate devices in FIG. 2A, they may be a combined into single device, or they may be divided into more than two devices. The first output device 260 and the second output device 265 can be two or more displays (also referred to as display screens), two or more portions of a single display, one or more wireless transmitters, one or more wired transmitters, one or more ports, one or more plugs or jacks, one or more I/O pins, any other types of communication interfaces discussed with respect to the communication interface 1040 of FIG. 10, any other types of output devices discussed with respect to the I/O 156 of FIG. 1, any other types of output devices discussed with respect to the I/O 160 of FIG. 1, any other types of output devices discussed with respect to the output device 1035 of FIG. 10, any other types of output devices or communication interfaces discussed herein, or a combination thereof.

For instance, the imaging system 250 can display, on one or more displays of the output devices 260-265 of the imaging system 250, the first image, the second image, a merged image generated by the imaging system 250 by merging the first image with the second image, or a combination thereof. The imaging system 250 can transmit, using a communication interface of the output devices 260-265 of the imaging system 250, the first image, the second image, a merged image generated by the imaging system 250 by merging the first image with the second image, or a combination thereof. The imaging system 250 can use the first image and the second image for performing stereo matching, scene 205 mapping, identification of a distance between the imaging system 250 and a part of the scene 205 (e.g., based on the stereo matching), feature extraction of a feature in the scene 205, feature tracking of a feature in the scene 205, feature mapping of a feature in the scene 205 (e.g., identifying 3D coordinates of the feature in the scene 205), localization (or relocalization) of the imaging system 250 within the scene 205, pose estimation of the imaging system 250 within the scene 205, various visual simultaneous localization and mapping (VSLAM) operations, combining virtual content into representations of the scene 205, various extended reality (XR) options, or combinations thereof.

In some examples, the second exposure timing engine 235 identifies a second exposure timing for the second image sensor 225. The exposure timing synchronizer 245 can identify a second ROI exposure time period at which the imaging system 250 exposes the second ROI image data at the second image sensor 225 according to the second exposure timing. Based on this (and/or the second exposure timing generally), the exposure timing synchronizer 245 and/or the first exposure timing engine 230 can set a first exposure timing for the first image sensor 220 to expose and/or capture a first image of the scene 205. The exposure timing synchronizer 245 and/or the first exposure timing engine 230 can set the first exposure timing so that, according to the first exposure timing and the second exposure timing, exposure of first ROI image data from the first image sensor 220 by the imaging system 250 and the exposure of the second ROI image data from the second image sensor 225 by the imaging system 250 are aligned (e.g., aligned based on start of exposure, aligned based on end of exposure, aligned based on middle of exposure), overlapping, and/or contemporaneous.

In some examples, an image capture and processing system 100, an image capture device 105A, and/or an image processing device 105B of FIG. 1 may include the first lens 210, the first image sensor 220, a connection to the first image sensor 220, the first exposure timing engine 230 for the first image sensor 220, the ROI identifier 240, the exposure timing synchronizer 245, the first output device 260, a connection to the first output device 260, or a combination thereof. In some examples, an image capture and processing system 100, an image capture device 105A, and/or an image processing device 105B of FIG. 1 may include the second lens 215, the second image sensor 225, a connection to the second image sensor 225, the second exposure timing engine 235 for the second image sensor 225, the ROI identifier 240, the exposure timing synchronizer 245, the second output device 265, a connection to the second output device 265, or a combination thereof. In some examples, the imaging system 250 may include one or more image capture and processing systems 100, one or more image capture devices 105A, one or more image processing devices 105B, one or more components described herein as part of the image capture and processing system 100, or a combination thereof.

FIG. 2B is a conceptual diagram illustrating exposure of an image sensor 275 of an imaging system using a rolling shutter 280, in accordance with some examples. Examples of image sensor 275 may include the first image sensor 220, the second image sensor 225, and/or the image sensor 130.

The rolling shutter 280 may be part of the control mechanisms 120, the first exposure timing engine 230 for the first image sensor 220, and/or the second exposure timing engine 235 for the second image sensor 225. Movement of the rolling shutter 280 relative to the image sensor 275 is illustrated relative to a horizontal time axis 490 along which time flows from left to right. The time axis 490 may be referred to as a timeline.

The rolling shutter 280 is illustrated as an opaque disc-shaped shutter with a cutout removed from the opaque shutter. The rolling shutter 280 is illustrated rotating in a clockwise direction as indicated by the rounded arrow drawn on the rolling shutter 280. In some cases, the rolling shutter 280 may instead rotate counter-clockwise. When the shutter portion of the rolling shutter 280 covers the image sensor 275, the image sensor 275 is not exposed, because light is blocked by the shutter portion of the rolling shutter. When the cutout of the rolling shutter 280 uncovers the image sensor 275, the image sensor 275 is exposed to light that passes through.

Because the rotation of the rolling shutter 280 is not instantaneous, the start of exposure of the image sensor is gradual, and occurs row-by-row. Likewise, the end of exposure of the image sensor is gradual, and occurs row-by-row. The rolling shutter 280 and the image sensor 275 are illustrated at a first time 285A, at a second time 285B, at a third time 285C, and at a fourth time 285D. At the first time 285A, the image sensor 275 is not yet exposed at all, because the shutter of the rolling shutter 280 is blocking light from reaching the image sensor 275. At the second time 285B, the start of exposure of the image sensor 275 has begun, as exposure has started for approximately the top half of the image sensor 275. The rolling shutter 280 has rotated so that the cutout is positioned over the top half of the image sensor 275 and permits light through the cutout to reach the top half of the image sensor 275. The bottom half of the image sensor 275 is not yet exposed, because the shutter of the rolling shutter 280 is blocking light from reaching the bottom half of the image sensor 275. At the third time 285C, exposure has started for all of the image sensor 275, because the rolling shutter 280 has rotated so that the cutout is positioned over the entirety of the image sensor 275 and permits light through the cutout to reach the entirety of the image sensor 275. At the fourth time 285D, the end of exposure of the image sensor 275 has begun, as exposure has ended for approximately the top half of the image sensor 275. The rolling shutter 280 has rotated so that the shutter portion is positioned over the top half of the image sensor 275 and blocks light from reaching the top half of the image sensor 275. The bottom half of the image sensor 275 is still being exposed, because the cutout is positioned over the bottom half of the image sensor 275 and permits light through the cutout to reach the bottom half of the image sensor 275. If the rolling shutter 280 continues to rotate clockwise as illustrated in FIG. 2B, the shutter portion will eventually cover the entire image sensor 275, blocks light from reaching any part of the image sensor 275 and ending exposure.

Figure 3:
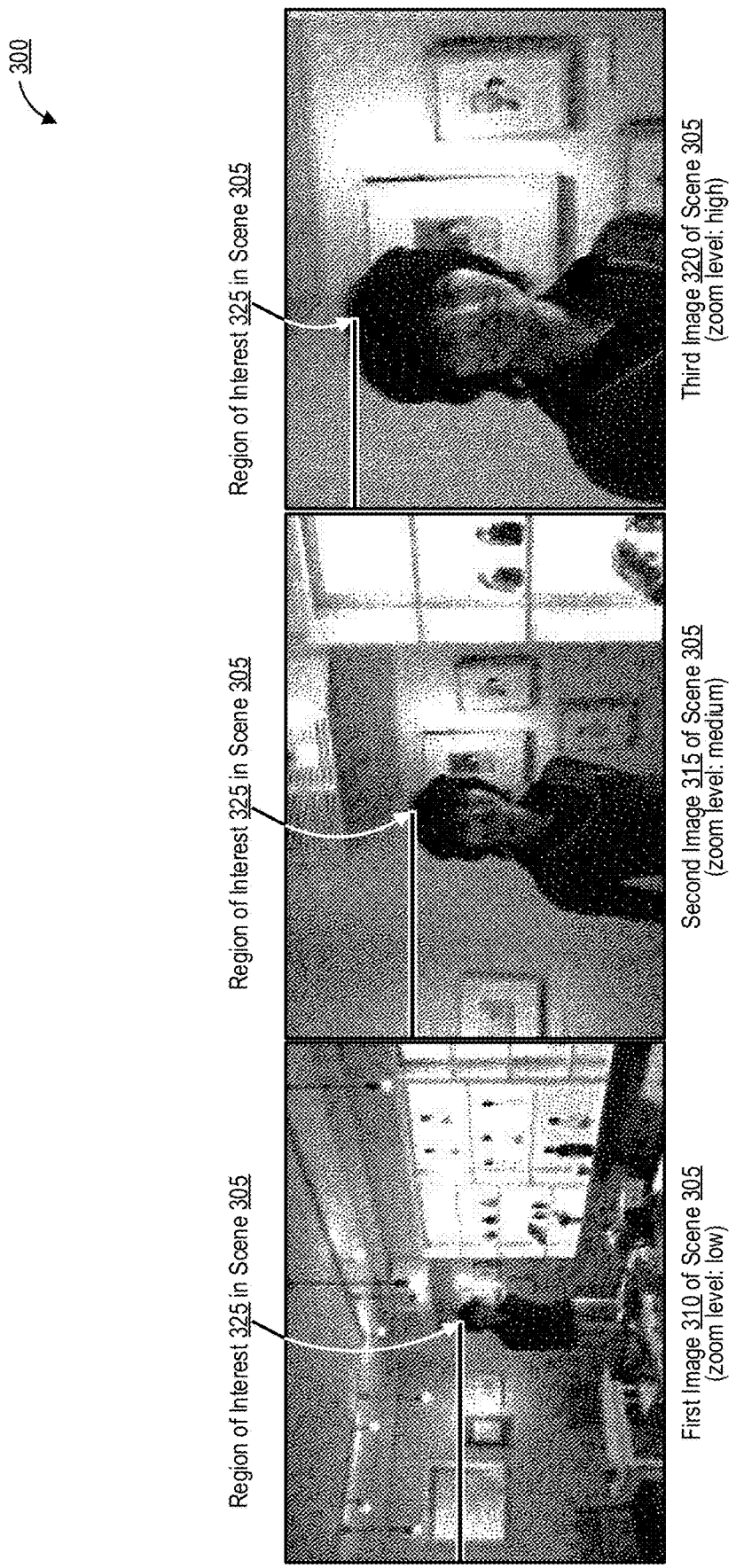
FIG. 3 is a conceptual diagram illustrating three images of a scene having three different zoom levels but sharing a region of interest (ROI), in accordance with some examples.

FIG. 3 is a conceptual diagram 300 illustrating three images 310, 315, and 320 of a scene 305 having three different zoom levels but sharing a region of interest (ROI) 325. The scene 305 is an example of a scene 205 and/or of a scene 110. The scene 305 depicts a woman standing in a room and facing the camera. The woman is in the foreground, while the rest of the room is in the background.

A first image 310 of the scene 305 has a low zoom level and/or low zoom strength. Because of the low zoom level, the first image 310 appears zoomed out compared to the second image 315 of the scene 305 and appears zoomed out compared to the third image 320 of the scene 305. Because of the low zoom level, the first image 310 depicts a large amount (e.g., a large percentage) of the room and of the woman. A second image 315 of the scene 305 has a medium zoom level and/or medium zoom strength. Because of the medium zoom level, the second image 315 appears zoomed in compared to first image 310 of the scene 305 and appears zoomed out compared to the third image 320 of the scene 305. Because of the low zoom level, the second image 315 depicts a medium amount (e.g., a medium percentage) of the room and of the woman. A third image 320 of the scene 305 has a high zoom level and/or high zoom strength. Because of the high zoom level, the third image 320 appears zoomed in compared to the second image 315 of the scene 305 and appears zoomed in compared to the first image 310 of the scene 305. Because of the high zoom level, the third image 320 depicts a small amount (e.g., a small percentage) of the room and of the woman.

A region of interest (ROI) 325 in the scene 305 is a top of the head of the woman in the scene 305. If the exposure of the image sensor(s) capturing the three images 310-320 exposes image data from top to bottom (e.g., as in FIG. 2B), the ROI 325 can correspond to the first row of image data, for first few rows of image data, that include ROI image data that depicts the woman in the scene 305. A first arrow is illustrated in FIG. 3 pointing to the ROI 325 in the scene 305 as depicted in the first image 310 of the scene 305. A first black line with a white outline is also overlaid over the first image 310 of the scene 305, the first black line highlighting the row of pixels that includes the ROI 325 in the first image 310, starting from the leftmost part of the row and ending at the ROI 325 in the first image 310. A second arrow is illustrated in FIG. 3 pointing to the ROI 325 in the scene 305 as depicted in the second image 315 of the scene 305. A second black line with a white outline is also overlaid over the second image 315 of the scene 305, the second black line highlighting the row of pixels that includes the ROI 325 in the second image 315, starting from the leftmost part of the row and ending at the ROI 325 in the second image 315. A third arrow is illustrated in FIG. 3 pointing to the ROI 325 in the scene 305 as depicted in the third image 320 of the scene 305. A third black line with a white outline is also overlaid over the third image 320 of the scene 305, the third black line highlighting the row of pixels that includes the ROI 325 in the third image 320, starting from the leftmost part of the row and ending at the ROI 325 in the third image 320.

Due to the differences in zoom between the first image 310, the second image 315, and the third image 320, the ROI 325 is depicted at a slightly different height within each respective image. For example, the ROI 325 is depicted near the top of the frame in the third image 320, and is depicted near the vertical middle of the frame in the first image 310. The position of the depiction of the ROI 325 in the second image 315 is between the near-top position of the third image 320 and the near-middle position of the first image 310. If the first image 310 is captured by a first image sensor, the second image 315 is captured by a second image sensor, and the third image 320 is captured by a third image sensor (e.g., each image sensor capturing light through lenses that provide different levels of zoom), then even with identical exposure times for the three images 310-320 in their entireties, ROI image data corresponding to the ROI 325 may be exposed at each of the three image sensors at different times. For example, if image data is exposed from the three image sensors from the top row of the frame to the bottom row of the frame, the exposure times for the three images 310-320 in their entireties are identical, and the exposure times for the three images start and end at identical times, then the third ROI image data from the third image 320 may be exposed at the third image sensor before the second ROI image data from the second image 315 is exposed at the second image sensor, and the second ROI image data from the second image 315 may be exposed at the second image sensor before the first ROI image data from the first image 310 is exposed at the first image sensor. Because of this, the depiction of the ROI 325 in the second image 315 represents how the ROI 325 looked at an earlier point in time than in the depiction of the ROI 325 in the first image 310, but at a later point in time than in the depiction of the ROI 325 in the third image 320.

In an illustrative example, to synchronize exposure of the ROI image data between the first image 310, the second image 315, and the third image 320, the exposure timing (e.g., the start and end of the exposure time) for the third image 320 and/or the third image sensor may be postponed so that the start of exposure of the ROI in the third image 320 and/or the third image sensor aligns with the start of exposure of the ROI in the second image 315 and/or the second image sensor. To synchronize exposure of the ROI image data between the first image 310, the second image 315, and the third image 320, the exposure timing (e.g., the start and end of the exposure time) for the first image 310 and/or the first image sensor may be preponed so that the start of exposure of the ROI in the first image 310 and/or the first image sensor aligns with the start of exposure of the ROI in the second image 315 and/or the second image sensor. In this example, the exposure timing for the second image 315 and/or the second image sensor are used as a base exposure timing that the exposure timings for the first image 310, first image sensor, third image 320, and third image sensor are aligned to.

In another illustrative example, the exposure timing for the first image 310 and the first image sensor can instead be used as a base exposure timing that the exposure timings for the second image 315, second image sensor, third image 320, and third image sensor are aligned to. To synchronize exposure of the ROI image data between the first image 310, the second image 315, and the third image 320, the exposure timing (e.g., the start and end of the exposure time) for the third image 320 and/or the third image sensor may be postponed so that the start of exposure of the ROI in the third image 320 and/or the third image sensor aligns with the start of exposure of the ROI in the first image 310 and/or the first image sensor. To synchronize exposure of the ROI image data between the first image 310, the second image 315, and the third image 320, the exposure timing (e.g., the start and end of the exposure time) for the second image 315 and/or the second image sensor may be postponed so that the start of exposure of the ROI in the second image 315 and/or the second image sensor aligns with the start of exposure of the ROI in the first image 310 and/or the first image sensor. In some examples, postponing may be preferable to preponing, and the base exposure timing may be selected to avoid preponing. In some examples, preponing may not be possible, for example in situations where a shutter can be delayed or slowed down but not sped up beyond its normal speed, and/or in situations where the imaging device has insufficient time remaining in which to prepone the exposure timing.

In yet another illustrative example, the exposure timing for the third image 320 and the third image sensor can instead be used as a base exposure timing that the exposure timings for the first image 310, first image sensor, second image 315, and second image sensor are aligned to. To synchronize exposure of the ROI image data between the first image 310, the second image 315, and the third image 320, the exposure timing (e.g., the start and end of the exposure time) for the first image 310 and/or the first image sensor may be preponed so that the start of exposure of the ROI in the first image 310 and/or the first image sensor aligns with the start of exposure of the ROI in the third image 320 and/or the third image sensor. To synchronize exposure of the ROI image data between the first image 310, the second image 315, and the third image 320, the exposure timing (e.g., the start and end of the exposure time) for the second image 315 and/or the second image sensor may be preponed so that the start of exposure of the ROI in the second image 315 and/or the second image sensor aligns with the start of exposure of the ROI in the third image 330 and/or the third image sensor.

FIG. 4A is a conceptual diagram 400A illustrating a representation of an exposure timing for the second image 315 of the scene 305 having a medium zoom level captured using a rolling shutter 280. A copy of the second image 315 of the scene 305 is illustrated in the upper-right corner of the conceptual diagram 400A for reference. An exploded copy 470 of the second image 315 of the scene 305 is illustrated in the center of the conceptual diagram 400A over a graph of the exposure timing for the second image 315 of the scene 305. The graph of the exposure timing for the second image 315 of the scene 305 is plotted as a function along a horizontal time axis 490 along which time flows from left to right. The time axis 490 may be referred to as a timeline. Exposure timing may be tracked and guided based on a pixel clock that keeps track of time along the time axis 490.

The exposure timing for the second image 315 of the scene 305 is illustrated as a boxcar function, a rectangular function, and/or a step function. The function representing exposure timing for the second image 315 of the scene 305 has a value of zero during a time period along the time axis 490 before image exposure 405A of the second image 315 (e.g., before the start of image exposure 410A of the second image 315) and during a time period along the time axis 490 after image exposure 425A of the second image 315 (e.g., after the end of image exposure 421A of the second image 315). The value of zero for the function representing exposure timing for the second image 315 indicates that the image sensor capturing the second image 315 is not exposed during the time period before image exposure 405A of the second image 315 (e.g., before the start of image exposure 410A) and during the time period after image exposure 425A of the second image 315 (e.g., after the end of image exposure 421A).

The function representing exposure timing for the second image 315 of the scene 305 has a value of one during a time period along the time axis 490 between the start of image exposure 410A of the second image 315 and the end of image exposure 421A of the second image 315. The value of one for the function representing exposure timing for the second image 315 indicates that the image sensor capturing the second image 315 is being exposed (e.g., an aperture letting in light is at least partially open) during the time period between the start of image exposure 410A of the second image 315 and the end of image exposure 421A of the second image 315.

The exploded copy 470 of the second image 315 is exploded into separate rows of image data to indicate that data from the second image 315 is being exposed at the second image sensor, with each row starting exposure after the row above it and before the row below it. Likewise, each row ends its exposure after the row above it and below the row below it. The exposure of rows of the second image sensor is thus staggered. However, many of the rows are exposed in parallel despite the staggered exposure start times and exposure end times for each row. The exploded copy 470 of the second image 315 appears skewed horizontally (along the time axis 490) to represent that the top row of the second image 315 begins exposure at the second image sensor before the bottom row of the second image 315 begins exposure at the second image sensor, and that exposure of each row takes a set amount of time before ending. The top-left corner of the exploded copy 470 of the second image 315 is illustrated at the point in time along the time axis 490 representing the start of image exposure 410A of the second image 315, indicating that exposure of the second image 315 begins from the top row of the second image 315. The bottom-right corner of the exploded copy 470 of the second image 315 is illustrated at the point in time along the time axis 490 representing the end of image exposure 421A of the second image 315, indicating that exposure of the second image 315 ends once exposure of the bottom row of the second image 315 ends. A curved arrow is illustrated pointing downward to the ROI 325 in the scene 305 in the exploded copy 470 of the second image 315. An indication of timing of the start of exposure 415A of ROI image data corresponding to the row 420A depicting the region of interest (ROI) 325 (or the top of the ROI 325) in the second image 315 is illustrated in FIG. 4A as a straight upward arrow extending from the graph to the left edge of the row 420A. An indication of timing of the end of exposure 417A of ROI image data corresponding to the row 420A depicting the region of interest (ROI) 325 (or the top of the ROI 325) in the second image 315 is illustrated in FIG. 4A as a straight downward arrow extending from the right edge of the row 420A to the graph.

FIG. 4B is a conceptual diagram 400B illustrating a representation of an exposure timing for the third image 320 of the scene 305 having a high zoom level captured using a rolling shutter 280. Like FIG. 4A with the second image 315, FIG. 4B includes a copy of the third image 320 of the scene 305 in the upper-right corner of the conceptual diagram 400B as well as exploded copy 475 of the third image 320 in the center of the conceptual diagram 400B. A graph of the exposure time for the third image 320 is plotted as a function along the horizontal time axis 490. Exposure timing may be tracked and guided based on a pixel clock that keeps track of time along the time axis 490.

The exposure timing for the third image 320 of the scene 305 is illustrated as a boxcar function, a rectangular function, and/or a step function. The function representing exposure timing for the third image 320 has a value of zero (indicating no exposure of the third image sensor) during a time period along the time axis 490 before image exposure 405B of the third image 320 (e.g., before the start of image exposure 410B of the third image 320) and during a time period along the time axis 490 after image exposure 425B of the third image 320 (e.g., after the end of image exposure 421B of the third image 320). The function representing exposure timing for the third image 320 of the scene 305 has a value of one (indicating exposure of the third image sensor) during a time period along the time axis 490 between the start of image exposure 410B of the third image 320 and the end of image exposure 421B of the third image 320.

The exploded copy 475 of the third image 320, like the exploded copy 470 of the second image 315, is exploded into separate rows of image data and is skewed horizontally along the time axis 490. The top-left corner of the exploded copy 475 of the third image 320 is illustrated at the point in time along the time axis 490 representing the start of image exposure 410B of the third image 320, indicating that exposure of the third image 320 begins from the top row of the third image 320. Each row starts exposure after the row above it and before the row below it. Each row ends its exposure after the row above it and below the row below it. The exposure of rows of the second image sensor is thus staggered. However, many of the rows are exposed in parallel despite the staggered exposure start times and exposure end times for each row. The bottom-right corner of the exploded copy 475 of the third image 320 is illustrated at the point in time along the time axis 490 representing the end of image exposure 421B of the third image 320, indicating that exposure of the third image 320 ends once exposure of the bottom row of the third image 320 ends. A curved arrow is illustrated pointing downward to the ROI 325 in the scene 305 in the exploded copy 475 of the third image 320. An indication of timing of start of exposure 415B of image data corresponding to the row 420B depicting the region of interest (ROI) 325 (or the top of the ROI 325) in the third image 320 is illustrated in FIG. 4B as a straight upward arrow extending from the graph to the left edge of the row 420B. An indication of timing of the end of exposure 417B of ROI image data corresponding to the row 420B depicting the region of interest (ROI) 325 (or the top of the ROI 325) in the second image 315 is illustrated in FIG. 4B as a straight downward arrow extending from the right edge of the row 420B to the graph. As discussed previously with respect to FIG. 3, the straight upward arrow indicating the timing of start of exposure 415B of the row 420B that includes the ROI 325 in the third image 320 is closer in time to the start of image exposure 410B of the third image 320 in FIG. 4B than the straight upward arrow indicating the timing of start of exposure 415A of the row 420A that includes the ROI 325 in the second image 315 is to the start of image exposure 410A of the second image 315 in FIG. 4A. Similarly, the straight downward arrow indicating the timing of end of exposure 417B of the row 420B that includes the ROI 325 in the third image 320 is closer in time to the start of image exposure 410B of the third image 320 in FIG. 4B than the straight downward arrow indicating the timing of end of exposure 417A of the row 420A that includes the ROI 325 in the second image 315 is to the start of image exposure 410A of the second image 315 in FIG. 4A.

Figure 5:
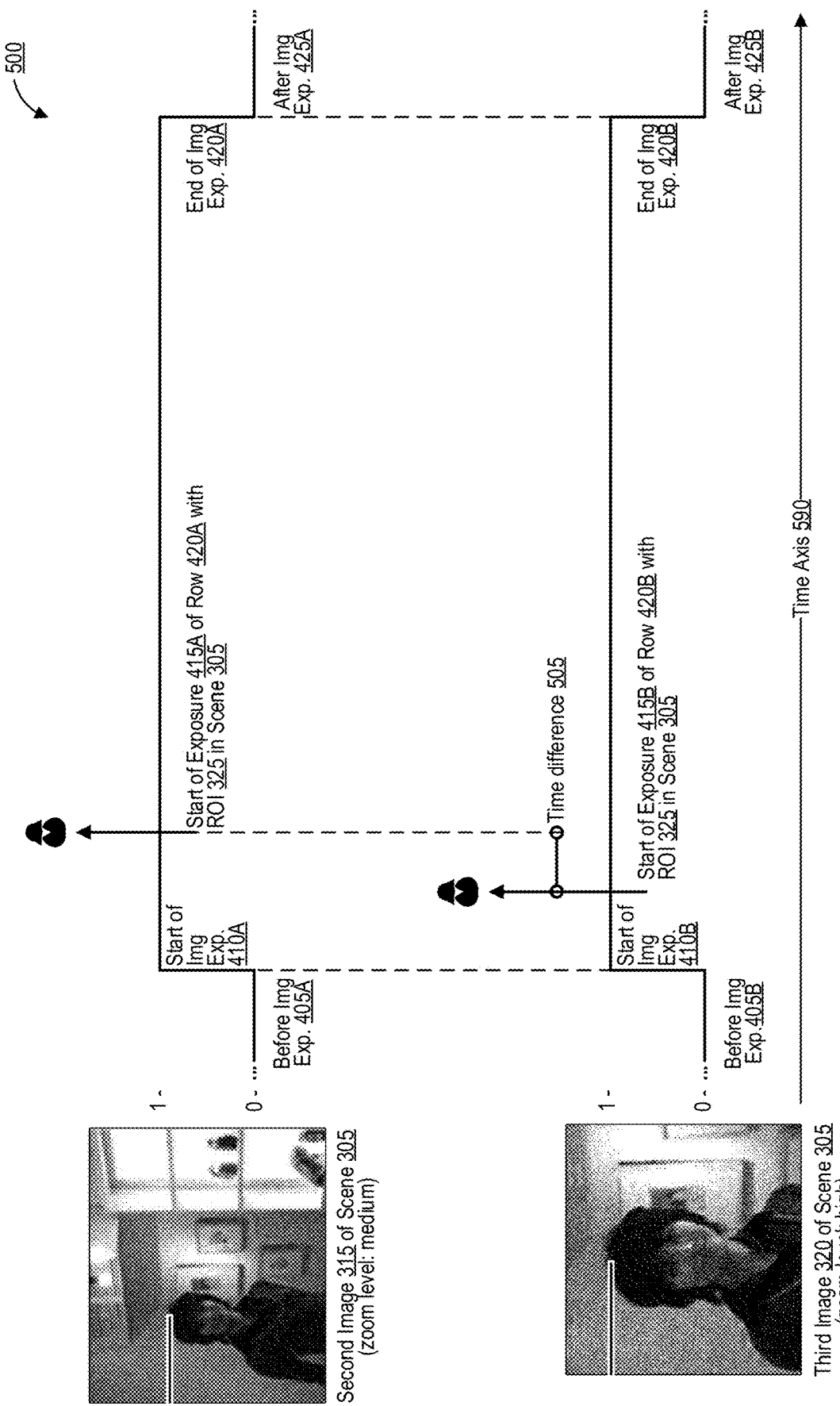
FIG. 5 is a conceptual diagram illustrating a comparison between the exposure timing for the second image of the scene and the exposure timing for the third image of the scene, in accordance with some examples.

FIG. 5 is a conceptual diagram 500 illustrating a comparison between the exposure timing for the second image 315 of the scene 305 and the exposure timing for the third image 320 of the scene 305, with the comparison indicating a time difference 505 in start of exposure of region of interest (ROI) image data corresponding to the ROI 325 between the second image 315 and the third image 320. The conceptual diagram 500 of FIG. 5 includes a copy of the second image 315 of the scene 305 next to a graph (as in FIG. 4A) of the function representing exposure timing for the second image 315, graphed along a time axis 590 with time again flowing from left to right. The conceptual diagram 500 of FIG. 5 includes a copy of the third image 320 of the scene 305 next to a graph (as in FIG. 4B) of the function representing exposure timing for the third image 320, graphed along the time axis 590. In the example illustrated in FIG. 5, the second image 315 and the third image 320 are captured contemporaneously and simultaneously, with identical exposure time durations and identical start and end points for those exposure time durations. For instance, the start of image exposure 410A of the second image 315 occurs at the same point in time along the time axis 590 as the start of image exposure 410B of the third image 320, as indicated by a vertical dashed line. Likewise, the end of image exposure 421A of the second image 315 occurs at the same point in time along the time axis 590 as the end of image exposure 421B of the third image 320, as indicated by a vertical dashed line. Despite this synchronization of exposure times for the second image 315 and the third image 320, there is a time difference 505 between the start of exposure 415A of the row 420A with the ROI 325 in the second image 315 of the scene 305 and the start of exposure 415B of the row 420B with the ROI 325 in the third image 320 of the scene 305. This time difference 505 is caused by the ROI 325 appearing higher up in the third image 320 than in the second image 315 due to higher zoom in the third image 320 than in the second image 315.

Reducing or eliminating the time difference 505 can be achieved, for example using an exposure timing synchronizer 245, by postponing (delaying) the start of image exposure 410B for the third image 320 so that the start of exposure 415B of the row 420B with the ROI 325 in the third image 320 of the scene 305 aligns with the start of exposure 415A of the row 420A with the ROI 325 in the second image 315 of the scene 305. Reducing or eliminating the time difference 505 can be achieved, for example using an exposure timing synchronizer 245, by preponing the start of image exposure 410A for the second image 315 so that the start of exposure 415A of the row 420A with the ROI 325 in the second image 315 of the scene 305 aligns with the start of exposure 415B of the row 420B with the ROI 325 in the third image 320 of the scene 305. Examples of postponing and preponing operations are illustrated in FIGS. 6B, 6C, 8B, and 8C.

FIG. 6A is a conceptual diagram 600A illustrating a comparison between a first exposure timing 630 for a first image sensor 635 and a second exposure timing 650A for a second image sensor 655, with the comparison indicating a time difference 605 in start of exposure of the region of interest (ROI) despite contemporaneous image exposure timing for the first image sensor 635 as a whole and for the second image sensor 655 as a whole. The first image sensor 635 can be an example of the first image sensor 220 of FIG. 2A. The first exposure timing 630 can be identified and/or set by the first exposure timing engine 230. The second image sensor 655 can be an example of the second image sensor 225 of FIG. 2A. The second exposure timing 650A can be identified and/or set by the second exposure timing engine 235.

The first exposure timing 630 and the second exposure timing 650A represent exposure timings for video capture. Three images (video frames) captured in quick succession according to the first exposure timing 630 and the second exposure timing 650A. The first exposure timing 630 and the second exposure timing 650A are illustrated as step functions, similarly to the exposure timings in FIGS. 4A, 4B, and 5. The step functions representing the first exposure timing 630 and the second exposure timing 650A each have a value of 1 while the corresponding image sensor is exposed (e.g., during capture of an image) and a value of 0 while the corresponding image sensor is not exposed (e.g., before, after, or between capture of images).

Similarly to FIG. 5, the exposure time durations for capture of each image are identical for the first sensor 635 under the first exposure timing 630 as they are for the second sensor 655 under the second exposure timing 650A. Similarly to FIG. 5, the start of image exposure and the end of image exposure for each image in the first exposure timing 630 are synchronized with the start of image exposure and the end of image exposure, respectively, for one of the images in the second exposure timing 660A. Similarly to FIG. 5, for each pair of images that are captured contemporaneously by the first image sensor 635 and the second image sensor 655 according to the first exposure timing 630 and the second exposure timing 650A, there is a time difference 605 between a first point in time 640 corresponding to start of exposure of first ROI image data corresponding to ROI 645 in the first image captured by the first image sensor 635 and a second point in time 660A corresponding to start of exposure of second ROI image data corresponding to ROI 645 in the second image captured by the second image sensor 655. Because the first exposure timing 630 and the second exposure timing 650A are for video capture, however, the time difference 605 persists throughout the entire video, if not corrected (e.g., using the exposure timing synchronizer 245) as in FIG. 6B or FIG. 6C. Persistent time differences 605 can cause persistent errors in stereo matching, depth sensing, scene mapping, localization, pose estimation, and the like.

FIG. 6B is a conceptual diagram 600B illustrating a comparison between the first exposure timing of FIG. 6A and a second exposure timing 650B that is postponed 610 compared to the second exposure timing 650A of FIG. 6A, so that start of exposure of the region of interest (ROI) is synchronized 615 between the first exposure timing 630 and the second exposure timing 650B. In some examples, the exposure timing synchronizer 245 identifies the second exposure timing 650A of FIG. 6A, detects the time difference 605 of FIG. 6A, and/or detects that the time difference 605 exceeds a threshold time difference. In some examples, the exposure timing synchronizer 245 sets the exposure timing of the second image sensor 655 to the second exposure timing 650B of FIG. 6B in response to detecting the time difference 605 of FIG. 6A and/or in response to detecting that the time difference 605 exceeds a threshold time difference. In some examples, the exposure timing synchronizer 245 sets the exposure timing of the second image sensor 655 to the second exposure timing 650B by postponing 610 the second exposure timing 650A of FIG. 6A until the first point in time 640 and the second point in time 660B are synchronized 615 (e.g., match or are within a threshold time of one another). Thus, start of exposure of the region of interest (ROI) is synchronized 615 between the first exposure timing 630 and the second exposure timing 650B. Once the exposure timing synchronizer 245 sets the exposure timing of the second image sensor 655 to the second exposure timing 650B of FIG. 6B, the second exposure timing 650A of FIG. 6A may be referred to as a prior second exposure timing 650A.

FIG. 6C is a conceptual diagram 600C illustrating a comparison between the first exposure timing of FIG. 6A and a second exposure timing that is preponed compared to the second exposure timing of FIG. 6A, so that start of exposure of the region of interest (ROI) is synchronized 615 between the first exposure timing and the second exposure timing. In some examples, the exposure timing synchronizer 245 identifies the second exposure timing 650A of FIG. 6A, detects the time difference 605 of FIG. 6A, and/or detects that the time difference 605 exceeds a threshold time difference. In some examples, the exposure timing synchronizer 245 sets the exposure timing of the second image sensor 655 to the second exposure timing 650C of FIG. 6C in response to detecting the time difference 605 of FIG. 6A and/or in response to detecting that the time difference 605 exceeds a threshold time difference. In some examples, the exposure timing synchronizer 245 sets the exposure timing of the second image sensor 655 to the second exposure timing 650B by preponing 620 the second exposure timing 650A of FIG. 6A until the first point in time 640 and the second point in time 660C are synchronized 615 (e.g., match or are within a threshold time of one another). Thus, start of exposure of the region of interest (ROI) is synchronized 615 between the first exposure timing 630 and the second exposure timing 650C. Once the exposure timing synchronizer 245 sets the exposure timing of the second image sensor 655 to the second exposure timing 650B of FIG. 6C, the second exposure timing 650A of FIG. 6A may be referred to as a prior second exposure timing 650A.

Figure 7:
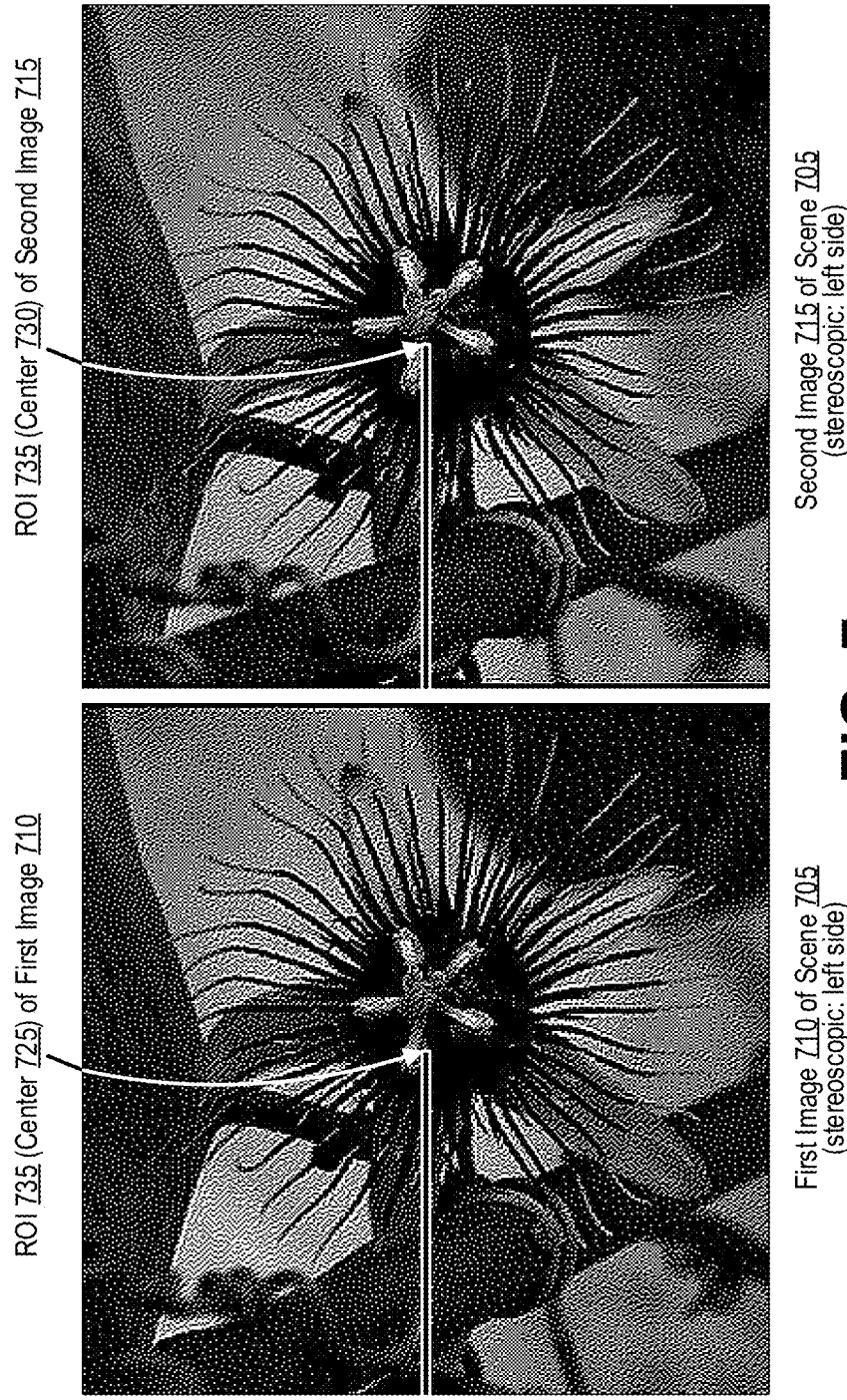
FIG. 7 is a conceptual diagram illustrating two images of a scene from slightly different vantage points and sharing a type of region of interest (ROI), in accordance with some examples.

FIG. 7 is a conceptual diagram 700 illustrating two images 710-715 of a scene from slightly different vantage points and sharing a type of region of interest (ROI) 735. The scene 705 is an example of a scene 205 and/or of a scene 110. The scene 705 depicts a flower in the foreground, with a blurry background.

A first image 710 of the scene 705 depicts the scene 705 from a first vantage point. The perspective of the scene 705 provided in the first image 710 by the first vantage point can be referred to as the first perspective. A second image 715 of the scene 705 depicts the scene 705 from a second vantage point that is slightly different from the first vantage point. The perspective of the scene 705 provided in the second image 715 by the second vantage point can be referred to as the second perspective. The first perspective may differ from the second perspective. In some examples, the first vantage point and the second vantage point can differ by approximately an inter-eye distance (e.g., a distance between two human eyes). For example, the first image 710 can be captured by a first image sensor (e.g., first image sensor 220). The second image 715 can be captured by a second image sensor (e.g., second image sensor 225). The first image sensor and the second image sensor may be positioned approximately an inter-eye distance apart from one another. In some examples, the first perspective and the second perspective can differ by an angle corresponding to the distance between the first and second vantage points. The first image sensor and the second image sensor may be part of a stereoscopic image capture device, such as an XR headset. The first image 710 and the second image 715 may be stereoscopic images of the scene 705. In the example illustrated in FIG. 7, the first image 710 is described as being a left-side image of a pair of stereoscopic images of the scene 705, and the second image 715 is described as being a right-side image of the pair of stereoscopic images of the scene 705. In some examples, the first image 710 can be the right-side image of the pair of stereoscopic images of the scene 705, and the second image 715 can be the left-side image of the pair of stereoscopic images of the scene 705.

The region of interest (ROI) 735 of the first image 710 is (or includes) the center 725 of the first image 710. The ROI 735 of the first image 710 can include the center 725 of the first image 710, and/or can include an area around the center 725 of the first image 710. The region of interest (ROI) 735 of the second image 715 is (or includes) the center 730 of the second image 715. The ROI 735 of the second image 715 can include the center 730 of the first image 710, and/or can include an area around the center 730 of the first image 710. A first arrow is illustrated in FIG. 7 pointing to the ROI 735 (center 725) in the first image 710 of the scene 705. A first black line with a white outline is also overlaid over the first image 710 of the scene 705, the first black line highlighting the row of pixels that includes the ROI 735 (center 725) in the first image 710, starting from the leftmost part of the row and ending at the ROI 735 (center 725) in the first image 710. A second arrow is illustrated in FIG. 7 pointing to the ROI 735 (center 730) in the second image 715 of the scene 705. A second black line with a white outline is also overlaid over the second image 715 of the scene 705, the second black line highlighting the row of pixels that includes the ROI 735 (center 730) in the second image 715, starting from the leftmost part of the row and ending at the ROI 735 (center 730) in the second image 715.

Due to the differences in field of view, vantage point, and/or perspective between the first image 710 and the second image 715, the center 725 of the first image 710 depicts a slightly different part of the scene 705 than the center 730 of the second image 715. For instance, the center 730 of the second image 715 is very close to the center of the flower depicted in the second image 715—closer than the center 725 of the first image 710 is to the center of the flower depicted in the first image 710. On the other hand, the center 725 of the first image 710 is offset to the left of the center of the flower depicted in the first image 710, moreso than the center 730 of the second image 715 is relative to the center of the flower depicted in the second image 715.

If the first image sensor that captures the first image 710 has different image sensor properties than the second image sensor that captures the second image 715, or if the full-image exposure time durations for the full first image 710 and the full second image 715 differ, then there may be a timing difference between a timing of a start of exposure of first ROI image data (corresponding to the center of the first image 710) from the first image sensor and a timing of a start of exposure of second ROI image data (corresponding to the center of the second image 715) from the second image sensor. An example of such a timing difference is illustrated in FIG. 8A. Examples of correction of such a timing difference are illustrated in FIG. 8B and FIG. 8C.

FIG. 8A is a conceptual diagram 800A illustrating a comparison between a first exposure timing 830 for a first image sensor 835 and a second exposure timing 850A for a second image sensor 855, with the comparison indicating a timing difference 805 in start of exposure of the region of interest (ROI) 845 and a difference in full image exposure time duration per image. The first image sensor 835 can be an example of the first image sensor 220 of FIG. 2A. The first exposure timing 830 can be identified and/or set by the first exposure timing engine 230. The second image sensor 855 can be an example of the second image sensor 225 of FIG. 2A. The second exposure timing 850A can be identified and/or set by the second exposure timing engine 235.

The first exposure timing 830 and the second exposure timing 850A represent exposure timings for video capture. Three images (video frames) captured in quick succession according to the first exposure timing 830 and the second exposure timing 850A. The first exposure timing 830 and the second exposure timing 850A are illustrated as step functions, similarly to the exposure timings in FIGS. 4A, 4B, 5, 6A, 6B, and 6C. The step functions representing the first exposure timing 830 and the second exposure timing 850A each have a value of 1 while the corresponding image sensor is exposed (e.g., during capture of an image) and a value of 0 while the corresponding image sensor is not exposed (e.g., before, after, or between capture of images).

A difference between FIG. 8A and FIG. 6A is that, in FIG. 8A, the exposure time durations for capture of each image are different for the first image sensor 835 under the first exposure timing 830 than they are for the second sensor 855 under the second exposure timing 850A. Similarly to FIG. 6A, the start of image exposure for the each image in the first exposure timing 830 are synchronized with the start of image exposure for one of the images in the second exposure timing 860A. A difference between FIG. 8A and FIG. 6A is that, in FIG. 8A, the end of image exposure for the each image in the first exposure timing 830 differs from the end of image exposure for the corresponding image in the second exposure timing 860A. Similarly to FIG. 6A, for each pair of images from the first image sensor 835 and the second image sensor 855 that share a start of image exposure between the first exposure timing 830 and the second exposure timing, there is a time difference 805 between a first point in time 840 corresponding to start of exposure of first ROI image data corresponding to ROI 845 in the first image captured by the first image sensor 835 and a second point in time 880A corresponding to start of exposure of second ROI image data corresponding to ROI 845 in the second image captured by the second image sensor 855. In FIG. 8A, the ROI 845 is an image center, like the ROI 735 of FIG. 7. In FIG. 8A, the time difference 805 is caused by the difference in exposure time duration between images captured by the first image sensor 835 according to the first exposure timing 830 and images captured by the second image sensor 855 according to the second exposure timing 850A. Because the first exposure timing 830 and the second exposure timing 850A are for video capture, the time difference 805 persists throughout the entire video, if not corrected (e.g., using the exposure timing synchronizer 245) as in FIG. 8B or FIG. 8C. Persistent time differences 805 can cause persistent errors in stereo matching, depth sensing, scene mapping, localization, pose estimation, and the like.

FIG. 8B is a conceptual diagram 800B illustrating a comparison between the first exposure timing 830 of FIG. 8A and a second exposure timing 850B that is postponed compared to the second exposure timing 850A of FIG. 8A, so that start of exposure of the region of interest (ROI) is synchronized between the first exposure timing 830 and the second exposure timing 850B. In some examples, the exposure timing synchronizer 245 identifies the second exposure timing 850A of FIG. 8A, detects the time difference 805 of FIG. 8A, detects that the time difference 805 exceeds a threshold time difference, and/or detects the difference in exposure time duration. In some examples, the exposure timing synchronizer 245 sets the exposure timing of the second image sensor 855 to the second exposure timing 850B of FIG. 8B in response to detecting the time difference 805 of FIG. 8A, in response to detecting that the time difference 805 exceeds a threshold time difference, and/or in response to detecting the difference in exposure time duration. In some examples, the exposure timing synchronizer 245 sets the exposure timing of the second image sensor 855 to the second exposure timing 850B by postponing 810 the second exposure timing 850A of FIG. 8A until the first point in time 840 and the second point in time 880B are synchronized 815 (e.g., match or are within a threshold time of one another). Thus, start of exposure of the region of interest (ROI) is synchronized 815 between the first exposure timing 830 and the second exposure timing 850B. Once the exposure timing synchronizer 245 sets the exposure timing of the second image sensor 855 to the second exposure timing 850B of FIG. 8B, the second exposure timing 850A of FIG. 8A may be referred to as a prior second exposure timing 850A.

FIG. 8C is a conceptual diagram 800C illustrating a comparison between the first exposure timing 830 of FIG. 8A and a second exposure timing 850C that is preponed compared to the second exposure timing 850A of FIG. 8A, so that start of exposure of the region of interest (ROI) is synchronized between the first exposure timing 830 and the second exposure timing 850C. In some examples, the exposure timing synchronizer 245 identifies the second exposure timing 850A of FIG. 8A, detects the time difference 805 of FIG. 8A, detects that the time difference 805 exceeds a threshold time difference, and/or detects the difference in exposure time duration. In some examples, the exposure timing synchronizer 245 sets the exposure timing of the second image sensor 855 to the second exposure timing 850C of FIG. 8C in response to detecting the time difference 805 of FIG. 8A, in response to detecting that the time difference 805 exceeds a threshold time difference, and/or in response to detecting the difference in exposure time duration. In some examples, the exposure timing synchronizer 245 sets the exposure timing of the second image sensor 855 to the second exposure timing 850B by preponing 820 the second exposure timing 850A of FIG. 8A until the first point in time 840 and the second point in time 880C are synchronized 815 (e.g., match or are within a threshold time of one another). Thus, start of exposure of the region of interest (ROI) is synchronized 815 between the first exposure timing 830 and the second exposure timing 850C. Once the exposure timing synchronizer 245 sets the exposure timing of the second image sensor 855 to the second exposure timing 850B of FIG. 8C, the second exposure timing 850A of FIG. 8A may be referred to as a prior second exposure timing 850A.

Figure 9:
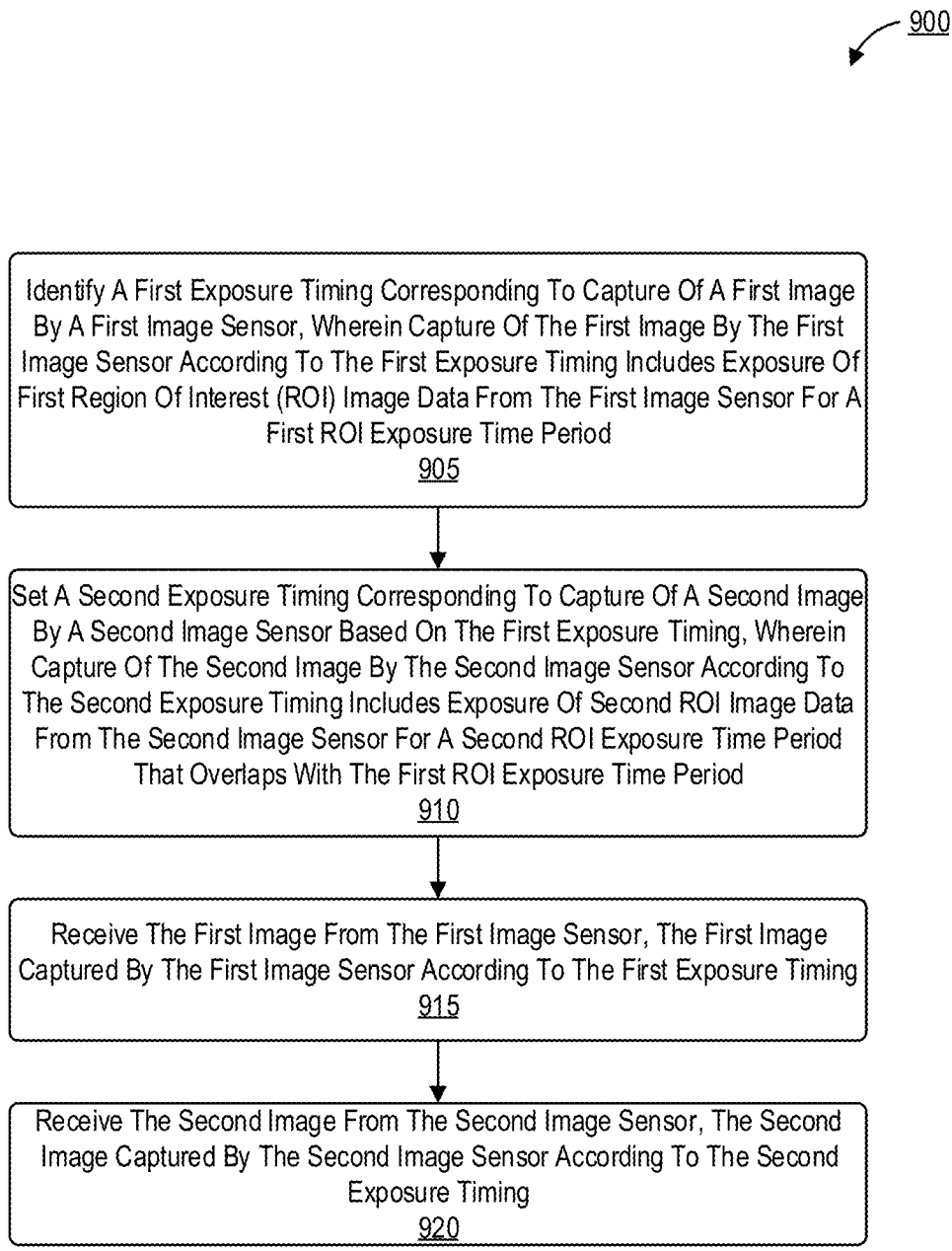
FIG. 9 is a flow diagram illustrating operations for imaging, in accordance with some examples.

FIG. 9 is a flow diagram 900 illustrating operations for imaging according to one or more of the techniques described herein. In some examples, the operations of the image processing technique illustrated in the flow diagram 900 may be performed by an imaging system. In an illustrative example, the imaging system is the imaging system 250. In some examples, the imaging system includes at least one of an image capture and processing system 100, an image capture device 105A, an image processing device 105B, an image processor 150, an ISP 154, a host processor 152, an imaging system 250, a first exposure timing engine 230 for a first image sensor 220, a second exposure timing engine 235 for a second image sensor 225, a ROI identifier 240, an exposure timing synchronizer 245, a first output device 260, a second output device 265, an artificial intelligence (AI) engine, a trained machine learning (ML) model, a trained neural network (NN), one or more network servers of a cloud service, one or more computing systems 1000, the processor 1010, another device or system described herein, or a combination thereof.

At operation 905, the imaging system identifies a first exposure timing corresponding to capture of a first image by a first image sensor. Capture of the first image by the first image sensor according to the first exposure timing includes exposure of first region of interest (ROI) image data from the first image sensor for a first ROI exposure time period. Examples of the first image sensor include the image sensor 130 of FIG. 1, the first image sensor 220 of FIG. 2A, and the image sensor 275 of FIG. 2B, the first image sensor 635, and the first image sensor 835. Examples of the first exposure timing include the first exposure timing 630 and the first exposure timing 830. Examples of the first image can include any of the images 310-320, the first image 710, and/or the second image 715. Exposure of the first image sensor according to the first exposure timing can be controlled by actuation of a shutter, such as the rolling shutter 280 of FIG. 2B, to rotate or otherwise move the shutter to uncover and/or cover the first image sensor like the rolling shutter 280 uncovers and covers the image sensor 275 over time 290. The imaging system can include the first image sensor.

In an illustrative example, the second image 315 of FIGS. 3, 4A, and 5 may be am example of the first image of operation 905. In this example, the first exposure timing may identify the time before image exposure 405A, the start of image exposure 410A, the start of exposure 415A of the row 420A with the ROI 325, the end of exposure 417A of the row 420A with the ROI 325, the end of image exposure 421A, and/or the time after image exposure 425A. In this example, the first ROI image data may include the row 420A with the ROI 325 in the scene 305. In this example, the first ROI image data may include one or more other rows in addition to the row 420A that depict the ROI 325 in the scene 305. In this example, the first ROI image data may include any image data depicting the ROI 325 in the scene 305.

In another illustrative example, the third image 315 of FIGS. 3, 4B, and 5 may be an example of the first image of operation 905. In this example, the first exposure timing may identify the time before image exposure 405B, the start of image exposure 410B, the start of exposure 415B of the row 420B with the ROI 325, the end of exposure 417B of the row 420B with the ROI 325, the end of image exposure 421B, and/or the time after image exposure 425B. In this example, the first ROI image data may include the row 420B with the ROI 325 in the scene 305. In this example, the first ROI image data may include one or more other rows in addition to the row 420B that depict the ROI 325 in the scene 305. In this example, the first ROI image data may include any image data depicting the ROI 325 in the scene 305.

In some examples, the imaging system can receive a third image from the first image sensor. The third image can be captured by the first image sensor according to the first exposure timing. The third image can be captured by the first image sensor before capture of the first image by the first image sensor. The imaging system can identify the first exposure timing based on exposure of the third image. For instance, the imaging system can identify a first timestamp associated with start of exposure of the third image and a second timestamp associated with end of exposure of the third image, and can identify the first exposure timing based on at least the first timestamp and the second timestamp. In some examples, the first image and the third image can be video frames of a video. The first image and the third image can be consecutive video frames of the video. In some examples, one or more additional frames may be captured by the first image sensor after capture of the third image and before capture of the first image.

At operation 910, the imaging system sets a second exposure timing corresponding to capture of a second image by a second image sensor based on the first exposure timing, wherein capture of the second image by the second image sensor according to the second exposure timing includes exposure of second ROI image data from the second image sensor for a second ROI exposure time period that overlaps with the first ROI exposure time period. Examples of the second image sensor include the image sensor 130 of FIG. 1 and the second image sensor 225 of FIG. 2A, and the image sensor 275 of FIG. 2B, the second image sensor 655, and the second image sensor 855. Examples of the second exposure timing include the second exposure timing 630B, the second exposure timing 630C, the second exposure timing 830B, and the second exposure timing 830C. Examples of the second image can include any of the images 310-320, the first image 710, and/or the second image 715. Exposure of the second image sensor according to the second exposure timing can be controlled by actuation of a shutter, such as the rolling shutter 280 of FIG. 2B, to rotate or otherwise move the shutter to uncover and/or cover the second image sensor like the rolling shutter 280 uncovers and covers the image sensor 275 over time 290. The imaging system can include the second image sensor.

In an illustrative example, the second image 315 of FIGS. 3, 4A, and 5 may be an example of the second image of operation 910. In this example, the second exposure timing may identify the time before image exposure 405A, the start of image exposure 410A, the start of exposure 415A of the row 420A with the ROI 325, the end of exposure 417A of the row 420A with the ROI 325, the end of image exposure 421A, and/or the time after image exposure 425A. In this example, the second ROI image data may include the row 420A with the ROI 325 in the scene 305. In this example, the second ROI image data may include one or more other rows in addition to the row 420A that depict the ROI 325 in the scene 305. In this example, the second ROI image data may include any image data depicting the ROI 325 in the scene 305.

In another illustrative example, the third image 315 of FIGS. 3, 4B, and 5 may be an example of the second image of operation 910. In this example, the second exposure timing may identify the time before image exposure 405B, the start of image exposure 410B, the start of exposure 415B of the row 420B with the ROI 325, the end of exposure 417B of the row 420B with the ROI 325, the end of image exposure 421B, and/or the time after image exposure 425B. In this example, the second ROI image data may include the row 420B with the ROI 325 in the scene 305. In this example, the second ROI image data may include one or more other rows in addition to the row 420B that depict the ROI 325 in the scene 305. In this example, the second ROI image data may include any image data depicting the ROI 325 in the scene 305.

The first ROI image data may correspond to a row of image data in the first image, as in the row 420A of the second image 315 of FIG. 4A or the row 420B of the third image 320 of FIG. 4B. The first ROI image data may correspond to more than one row of image data in the first image. For instance, in the context of the second image 315 of FIG. 4A, the ROI 325 (the person) fills more rows than just the top row 420A. In the context of the third image 320 of FIG. 4B, the ROI (the person) 325 fills more rows than just the top row 420A.

The second ROI image data may correspond to a row of image data in the second image, as in the row 420A of the second image 315 of FIG. 4A or the row 420B of the third image 320 of FIG. 4B. The second ROI image data may correspond to more than one row of image data in the first image. For instance, in the context of the second image 315 of FIG. 4A, the ROI 325 (the person) fills more rows than just the top row 420A. In the context of the third image 320 of FIG. 4B, the ROI (the person) 325 fills more rows than just the top row 420A.

The first ROI image data can depict at least part of an object of interest in a scene. For instance, in the images 310-320 of FIGS. 3, 4A, 4B, and 5, the ROI 325 depicts at least the top of the head of the woman in the scene 305 (or more of the woman in the scene 305). The second ROI image data can depict at least part of an object of interest in a scene. For instance, in the images 310-320 of FIGS. 3, 4A, 4B, and 5, the ROI 325 depicts at least the top of the head of the woman in the scene 305 (or more of the woman in the scene 305). The object depicted in the first ROI image data can be the same object depicted in the second ROI image data. The object depicted in the first ROI image data can be a different object depicted in the second ROI image data. The scene depicted in the first image can be the same scene depicted in the second image. The scene depicted in the first image can be a different scene than a scene depicted in the second image.

The imaging system can identify, using an object detection algorithm, a first depiction of at least the part of the object of interest in a third image captured by the first image sensor before capture of the first image. In some examples, the first image and the third image can be video frames of a video. The first image and the third image can be consecutive video frames of the video. In some examples, one or more additional frames may be captured by the first image sensor after capture of the third image and before capture of the first image. The object may be a person, a face, a hand, another body part of a person, a vehicle, an animal, a tree, a plant, a structure, a heavenly body (e.g., sun, moon, stars), an inanimate object, a set of one or more features, another type of object discussed herein, or a combination thereof.

The imaging system can identify, using the object detection algorithm, a second depiction of at least the part of the object of interest in a fourth image captured by the first image sensor before capture of the second image. In some examples, the second image and the fourth image can be video frames of a video. The second image and the fourth image can be consecutive video frames of the video. In some examples, one or more additional frames may be captured by the second image sensor after capture of the fourth image and before capture of the second image. The object may be a person, a face, a hand, another body part of a person, a vehicle, an animal, a tree, a plant, a structure, a heavenly body (e.g., sun, moon, stars), an inanimate object, a set of one or more features, another type of object discussed herein, or a combination thereof.

The object detection algorithm used by the imaging system to identify at least the part the object in the third image and/or in the fourth image may be an object detection algorithm, an object recognition algorithm, an object tracking algorithm, a facial detection algorithm, a facial recognition algorithm, a facial tracking algorithm, a person detection algorithm, a person recognition algorithm, a person tracking algorithm, a vehicle detection algorithm, a vehicle recognition algorithm, a vehicle tracking algorithm, a feature detection algorithm, a feature recognition algorithm, a feature tracking algorithm, or a combination thereof. The object detection algorithm used by the imaging system to identify at least the part the object in the third image and/or in the fourth image may be a saliency map algorithm that generates a saliency map based on the third image and/or in the fourth image, and identifies the object based on the saliency map. The object detection algorithm may detect, recognize, and/or track the object and/or features thereof using a trained classifier. The object detection algorithm may detect, recognize, and/or track the object and/or features thereof by comparing the depiction of the object in the third and/or fourth image (and/or features extracted therefrom by the imaging system) to enrolled reference images of objects having known identities (and/or stored enrolled reference features previously extracted therefrom by the imaging system). The object detection algorithm may detect, recognize, and/or track the object and/or features thereof in a bounding box. The object detection algorithm may detect, recognize, and/or track the object and/or features thereof using one or more machine learning systems that may include one or more trained convolutional neural networks (CNNs), one or more trained deep neural networks (DNNs), one or more trained neural networks (NNs), one or more trained support vector machines (SVMs), one or more trained random forests, one or more other trained machine learning models, or a combination thereof. The one or more machine learning systems may utilize supervised learning, unsupervised learning, deep learning, or a combination thereof.

The imaging system can receive an input through a user interface. The input can identify the object of interest. In some examples, the input may be a touchscreen or cursor input touching, clicking on, circling, drawing a box around, highlighting, and/or otherwise identifying the object of interest in a prior image captured by at least one of the first image sensor or the second image sensor. The input can also be a text-based input through a text-input user interface, such as a keyboard or keypad. The text-based input can identify the object of interest by identifying a category of object, a type of object, an identity of an object, and/or a name of an object. In the example of the ROI 325 of the images 310-320 of FIG. 3, the text-based input can include, for example, "person," "woman," "foreground," "foreground object," "foreground person," "foreground woman," "woman with short hair," "woman with dark hair," the name of the woman depicted in the images 310-320, or combination thereof. The input can identify a portion of an image frame of the first image and/or the second image, such as the center of the image frame of the first image and/or the second image (as in FIG. 7).

The first ROI image data can include a center of the first image. The second ROI image data can include a center of the second image. For instance, the ROI 735 of the first image 710 is the center 725 of the first image 710, and the ROI 735 of the second image 715 is the center 730 of the second image 715.

In some examples, the first image has a first field of view and the second image has a second field of view that differs from the first field of view. The first field of view may differ from the second field of view based on perspective, as in the stereoscopic right-side first image 710 and the stereoscopic left-side second image 715 of FIG. 7. The first field of view may differ from the second field of view based on zoom level, as in the low-zoom first image 310, the medium-zoom second image 315, and the high-zoom third image 320 of FIG. 3.

Setting the second exposure timing can include aligning a start of the second ROI exposure time period with a start of the first ROI exposure time period. Examples of the start of the second ROI exposure time period can include the start of exposure 415A of the row 420A with ROI 325 in the second image 315, the start of exposure 415B of the row 420B with ROI 325 in the third image 320, the second point in time 660A corresponding to start of exposure, the second point in time 660B corresponding to start of exposure, the second point in time 660C corresponding to start of exposure, the second point in time 880A corresponding to start of exposure, the second point in time 880B corresponding to start of exposure, and the second point in time 880C corresponding to start of exposure. Examples of the start of the first ROI exposure time period can include the start of exposure 415A of the row 420A with ROI 325 in the second image 315, the start of exposure 415B of the row 420B with ROI 325 in the third image 320, the first point in time 640 corresponding to start of exposure, and the first point in time 840 corresponding to start of exposure. Aligning the start of the second ROI exposure time period with the start of the first ROI exposure time period can include reducing a time difference between the start of the second ROI exposure time period and the start of the first ROI exposure time period (e.g., time difference 505, time difference 605, time difference 805) by postponing (e.g., postpone 610, postpone 810) or preponing (e.g., prepone 620, prepone 820) a prior second exposure timing to generate the second exposure timing.

Setting the second exposure timing can include aligning an end of the second ROI exposure time period with an end of the first ROI exposure time period. Examples of the end of the second ROI exposure time period can include the end of exposure 417A of the row 420A with ROI 325 in the second image 315 and the end of exposure 417B of the row 420B with ROI 325 in the third image 320. Examples of the end of the first ROI exposure time period can include the end of exposure 417A of the row 420A with ROI 325 in the second image 315 and the end of exposure 417B of the row 420B with ROI 325 in the third image 320. While the imaging systems of FIGS. 5, 6A-6C, and 8A-8C identify time differences based on start of exposure of ROI image data and align based on start of exposure of ROI image data, the imaging systems of FIGS. 5, 6A-6C, and 8A-8C may be modified to identify time differences based on end of exposure of ROI image data and align based on end of exposure of ROI image data. Aligning the end of the second ROI exposure time period with the end of the first ROI exposure time period can include reducing a time difference between the end of the second ROI exposure time period and the end of the first ROI exposure time period (e.g., time difference 505, time difference 605, time difference 805) by postponing (e.g., postpone 610, postpone 810) or preponing (e.g., prepone 620, prepone 820) a prior second exposure timing to generate the second exposure timing.

Setting the second exposure timing can include aligning a middle of the second ROI exposure time period with a middle of the first ROI exposure time period. Examples of the middle of the second ROI exposure time period can include a midpoint between the start of exposure 415A and the end of exposure 417A of the row 420A with ROI 325 in the second image 315, and a midpoint between the start of exposure 415B and the end of exposure 417B of the row 420B with ROI 325 in the third image 320. Examples of the middle of the first ROI exposure time period can include a midpoint between the start of exposure 415A and the end of exposure 417A of the row 420A with ROI 325 in the second image 315, and a midpoint between the start of exposure 415B and the end of exposure 417B of the row 420B with ROI 325 in the third image 320. While the imaging systems of FIGS. 5, 6A-6C, and 8A-8C identify time differences based on start of exposure of ROI image data and align based on start of exposure of ROI image data, the imaging systems of FIGS. 5, 6A-6C, and 8A-8C may be modified to identify time differences based on middle of exposure of ROI image data and align based on middle of exposure of ROI image data. Aligning the middle of the second ROI exposure time period with the middle of the first ROI exposure time period can include reducing a time difference between the middle of the second ROI exposure time period and the middle of the first ROI exposure time period (e.g., time difference 505, time difference 605, time difference 805) by postponing (e.g., postpone 610, postpone 810) or preponing (e.g., prepone 620, prepone 820) a prior second exposure timing to generate the second exposure timing.

Setting the second exposure timing can includes aligning part of the second ROI exposure time period to be contemporaneous with part of the first ROI exposure time period. The part of the second ROI exposure time period can be, or can include, at least the start, the middle, or the end first ROI exposure time period as discussed above. The part of the first ROI exposure time period can be, or can include, at least the start, the middle, or the end of the first ROI exposure time period as discussed above.

Before setting the second exposure timing at operation 910, the imaging system can identify a prior second exposure timing corresponding to the second image sensor. The second image sensor is configured to expose the second ROI image data for a prior second ROI exposure time period according to the prior second exposure timing. The imaging system can identify a timing difference between a start of the first ROI exposure time period and a start of a prior second ROI exposure time period. Setting the second exposure timing at operation 910 can include adjusting the prior second exposure timing to reduce the timing difference. Examples of the prior second exposure timing can include the second exposure time 650A, the second exposure time 850A, and either of the exposure timings of FIG. 5 (if the other exposure timing of FIG. 5 is the first exposure timing). Examples of the time difference can include the time difference 505, the time difference 605, and the time difference 805. Examples of the start of the prior second ROI exposure time period can include the second point in time 660A, the second point in time 880A, and either one of the start of exposure 415A or the start of exposure 415B of FIG. 5 (if the other start of exposure of FIG. 5 is the start of the first ROI exposure time period). Examples of the start of the first ROI exposure time period include the first point in time 640, the first point in time 840, and either one of the start of exposure 415A or the start of exposure 415B of FIG. 5 (if the other start of exposure of FIG. 5 is the start of the prior second ROI exposure time period).

Setting the second exposure timing can include moving and/or adjusting prior second exposure timing based on the timing difference. Moving and/or adjusting the prior second exposure timing can include postponing the prior second exposure timing based on the timing difference. For example, the second exposure timing 650B is set by postponing 610 the second exposure timing 650A by the timing difference 605. Likewise, the second exposure timing 850B is set by postponing 810 the second exposure timing 850A by the timing difference 805. Moving and/or adjusting the prior second exposure timing can include preponing the prior second exposure timing based on the timing difference. For example, the second exposure timing 650C is set by preponing 620 the second exposure timing 650A by an image exposure cycle less the timing difference 605. Likewise, the second exposure timing 850C is set by preponing 820 the second exposure timing 850A by an image exposure cycle less the timing difference 805.

Setting the second exposure timing can include moving and/or adjusting a start of exposure for the second image relative to a prior start of exposure for the second image based on the timing difference. Examples of the prior start of exposure for the second image include the rising steps of the second exposure timing 650A, the rising steps of the second exposure timing 850A, and the start of image exposure 410A and/or the start of image exposure 410B. Examples of the start of exposure for the second image include the rising steps of the second exposure timing 650B, the rising steps of the second exposure timing 650C, the rising steps of the second exposure timing 850B, and the rising steps of the second exposure timing 850C. The prior start of exposure for the second image corresponds to the prior second exposure timing. Moving and/or adjusting the start of exposure for the second image relative to the prior start of exposure for the second image based on the timing difference can include postponing the start of exposure for the second image relative to the prior start of exposure for the second image based on the timing difference. For example, the second exposure timing 650B is set by postponing 610 the start of exposure for the images in (the rising steps in) the second exposure timing 650A by the timing difference 605. Likewise, the second exposure timing 850B is set by postponing 810 the start of exposure for the images in (the rising steps in) the second exposure timing 850A by the timing difference 805. Moving and/or adjusting the start of exposure for the second image relative to the prior start of exposure for the second image based on the timing difference can include preponing the start of exposure for the second image relative to the prior start of exposure for the second image based on the timing difference. For example, the second exposure timing 650C is set by preponing 620 the start of exposure for the images in (the rising steps in) the second exposure timing 650A by an image exposure cycle less the timing difference 605. Likewise, the second exposure timing 850C is set by preponing 820 the start of exposure for the images in (the rising steps in) the second exposure timing 850A by an image exposure cycle less the timing difference 805.

In some examples, the imaging system can receive a fourth image from the second image sensor. The fourth image can be captured by the second image sensor according to the prior second exposure timing. The fourth image can be captured by the second image sensor before capture of the second image by the second image sensor. The imaging system can identify the prior second exposure timing based on exposure of the fourth image. For instance, the imaging system can identify a first timestamp associated with start of exposure of the fourth image and a second timestamp associated with end of exposure of the fourth image, and can identify the prior second exposure timing based on at least the first timestamp and the second timestamp. In some examples, the second image and the fourth image can be video frames of a video. The second image and the fourth image can be consecutive video frames of the video. In some examples, one or more additional frames may be captured by the second image sensor after capture of the fourth image and before capture of the second image.

At operation 915, the imaging system receives the first image from the first image sensor. The first image is captured by the first image sensor according to the first exposure timing. In some examples, the first image is at least partially processed (e.g., by the ISP 154) before the imaging system receives the first image. In some examples, the imaging system may include a connector coupled to the first image sensor, and the first image may be received using the connector. The connector may include a port, a jack, a wire, an input/output (IO) pin, a conductive trace on a printed circuit board (PCB), any other type of connector discussed herein, or some combination thereof. In some examples, the imaging system may include the first image sensor that captures the first image.

At operation 920, the imaging system receives the second image from the second image sensor. The second image is captured by the second image sensor according to the second exposure timing. In some examples, the second image is at least partially processed (e.g., by the ISP 154) before the imaging system receives the second image. In some examples, the imaging system may include a connector coupled to the second image sensor, and the second image may be received using the connector. The connector may include a port, a jack, a wire, an input/output (IO) pin, a conductive trace on a printed circuit board (PCB), any other type of connector discussed herein, or some combination thereof. In some examples, the imaging system may include the second image sensor that captures the second image.

In some examples, the imaging system can identify a distance between the imaging system and a portion of a scene that is depicted in the first image and in the second image. Identifying the distance can include performing stereo matching based on the first image and the second image. The imaging system can includes the first image sensor and the second image sensor. In some examples, the imaging system can identify a first distance between the first image sensor and the portion of the scene, and/or a second distance between the second image sensor and the portion of the scene, using stereo matching. The portion of the scene can be an object, such as a person, a face, a hand, another body part of a person, a vehicle, an animal, a tree, a plant, a structure, a heavenly body (e.g., sun, moon, stars), an inanimate object, a set of one or more features, another type of object discussed herein, or a combination thereof.

In some examples, the imaging system can generate a merged image at least by merging the first image and the second image. The merged image can include a panoramic image, in which case merging the first image and the second image can include stitching the first image and the second image together using panoramic stitching. The merged image can include a high dynamic range (HDR) image, in which case merging the first image and the second image can include HDR merging of the first image and the second image. The merged image can include a composite image, in which case merging the first image and the second image can include compositing the first image and the second image together using image compositing.

In some examples, the imaging system can include one or more displays. Examples of the one or more displays include the I/O devices 156, the I/O devices 160, the output device 1035, or a combination thereof. The imaging system can be configured to, and can, display the first image and/or the second image on the one or more displays. In some examples, the one or more displays can be coupled to the imaging system over one or more display connectors, and, to display the first image and/or the second image on the one or more displays. The imaging system can send the first image and/or the second image to the one or more displays over the one or more display connectors. In some examples, the one or more displays can include a first display that displays the first image to a first eye of a user and a second display that displays the second image to a second eye of the user. For instance, the one or more displays can include a left display that displays the first image to a left eye and a right display that displays the second image to a right eye, or vice versa. In some examples, the one or more displays can include a single display that displays the first image on a first portion of the display to a first eye of a user and that displays the second image on a second portion of the display to a second eye of the user. For instance, a left portion of the display can display the first image to a left eye and a right portion of the display can displays the second image to a right eye, or vice versa. The one or more displays can be display(s) of a head-mounted display (HMD) device and/or an extended reality (XR) device that is worn and/or used by the user. Examples of an XR device can include a virtual reality (VR) device, an augmented reality (AR) device, a mixed reality (MR) device, or a combination thereof.

In some examples, the imaging system can include a communication transceiver. Examples of the communication transceiver include the I/O devices 156, the I/O devices 160, the communication interface 1040, or a combination thereof. The imaging system can be configured to, and can, transmit the first image and/or the second image to a recipient device using the communication transceiver. The recipient device may include at least one of an image capture and processing system 100, an image capture device 105A, an image processing device 105B, an image processor 150, an ISP 154, a host processor 152, an imaging system 250, a first exposure timing engine 230 for a first image sensor 220, a second exposure timing engine 235 for a second image sensor 225, a ROI identifier 240, an exposure timing synchronizer 245, a first output device 260, a second output device 265, an artificial intelligence (AI) engine, a trained machine learning (ML) model, a trained neural network (NN), one or more network servers of a cloud service, one or more computing systems 1000, or a combination thereof. In some examples, the communication transceiver can be coupled to the imaging system over one or more communication transceiver connectors, an, to display the first image and/or the second image on the one or more displays. The imaging system can send the first image and/or the second image to the one or more displays over the one or more display connectors.

In some aspects, the imaging system can include: means for identifying a first exposure timing corresponding to capture of a first image by a first image sensor, wherein capture of the first image by the first image sensor according to the first exposure timing includes exposure of first region of interest (ROI) image data from the first image sensor for a first ROI exposure time period; means for setting a second exposure timing corresponding to capture of a second image by a second image sensor based on the first exposure timing, wherein capture of the second image by the second image sensor according to the second exposure timing includes exposure of second ROI image data from the second image sensor for a second ROI exposure time period that overlaps with the first ROI exposure time period; means for receiving the first image from the first image sensor, the first image captured by the first image sensor according to the first exposure timing; and means for receiving the second image from the second image sensor, the second image captured by the second image sensor according to the second exposure timing.

In some examples, the means for identifying a first exposure timing can include the image capture and processing system 100, the image capture device 105A, the image processing device 105B, the image processor 150, the image sensor 130, the ISP 154, the host processor 152, the imaging system 250, the first image sensor 220, the first exposure timing engine 230 for a first image sensor 220, the second exposure timing engine 235 for the second image sensor 225, the ROI identifier 240, the exposure timing synchronizer 245, the image sensor 275, the rolling shutter 280, the first image sensor 635, the first image sensor 830, one or more computing systems 1000, the processor 1010, an input device 1045, or a combination thereof. In some examples, the means for setting the second exposure timing can include the image capture and processing system 100, the image capture device 105A, the image processing device 105B, the image processor 150, the image sensor 130, the ISP 154, the host processor 152, the imaging system 250, the first exposure timing engine 230 for a first image sensor 220, the second image sensor 225, the second image sensor 225, the second exposure timing engine 235 for the second image sensor 225, the ROI identifier 240, the exposure timing synchronizer 245, the image sensor 275, the rolling shutter 280, the second image sensor 655, the second image sensor 855, one or more computing systems 1000, the processor 1010, an input device 1045, or a combination thereof.

In some examples, the means for receiving the first image includes the image capture and processing system 100, the image capture device 105A, the image processing device 105B, the image processor 150, the image sensor 130, the ISP 154, the host processor 152, the imaging system 250, the first image sensor 220, the first exposure timing engine 230 for a first image sensor 220, the second exposure timing engine 235 for the second image sensor 225, the ROI identifier 240, the exposure timing synchronizer 245, the first output device 260, the second output device 265, the image sensor 275, the rolling shutter 280, the first image sensor 635, the first image sensor 830, one or more computing systems 1000, the processor 1010, an input device 1045, or a combination thereof. In some examples, the means for receiving the second image includes the image capture and processing system 100, the image capture device 105A, the image processing device 105B, the image processor 150, the image sensor 130, the ISP 154, the host processor 152, the imaging system 250, the first exposure timing engine 230 for a first image sensor 220, the second image sensor 225, the second image sensor 225, the second exposure timing engine 235 for the second image sensor 225, the ROI identifier 240, the exposure timing synchronizer 245, the first output device 260, the second output device 265, the image sensor 275, the rolling shutter 280, the second image sensor 655, the second image sensor 855, one or more computing systems 1000, the processor 1010, an input device 1045, or a combination thereof.

The image processing technique illustrated in the flow diagram 900 may also include any operation discussed illustrated in, or discussed with respect to, any of the conceptual diagrams, block diagrams, and flow diagrams 100, 200, and/or 1000.

In some cases, at least a subset of the techniques illustrated by the any of the conceptual diagrams, block diagrams, and flow diagrams 100, 200, 900, and/or 1000 may be performed remotely by one or more network servers of a cloud service. In some examples, the processes described herein (e.g., processes including those illustrated by the conceptual diagrams, block diagrams, and flow diagrams 100, 200, 900, 1000, and/or other processes described herein) may be performed by a computing system or apparatus. In some examples, the processes illustrated by the conceptual diagrams, block diagrams, and flow diagrams 100, 200, 900, and/or 1000 can be performed by the image capture device 105A of FIG. 1, the image processing device 105B of FIG. 1, and/or the image capture and processing system 100 of FIG. 1. In some examples, the processes illustrated by the conceptual diagrams, block diagrams, and flow diagrams 100, 200, 900, and/or 1000 can be performed by the imaging system 250 of FIG. 2A. In some examples, the processes illustrated by the conceptual diagrams, block diagrams, and flow diagrams 100, 200, 900, and/or 1000 can be performed by a computing system with the architecture of the computing system 1000 shown in FIG. 10. The computing system can include any suitable device, such as a mobile device (e.g., a mobile phone), a desktop computing device, a tablet computing device, a wearable device (e.g., an XR headset, XR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes illustrated by the conceptual diagrams, block diagrams, and flow diagrams 100, 200, 900, and/or 1000. In some cases, the computing system or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing system may include a display, a network interface configured to communicate and/or receive the data, any combination thereof, and/or other component(s). The network interface may be configured to communicate and/or receive Internet Protocol (IP) based data or other type of data.

The components of the computing system can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams, block diagrams, and flow diagrams 100, 200, 900, and/or 1000 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams, block diagrams, and flow diagrams 100, 200, 900, 1000, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
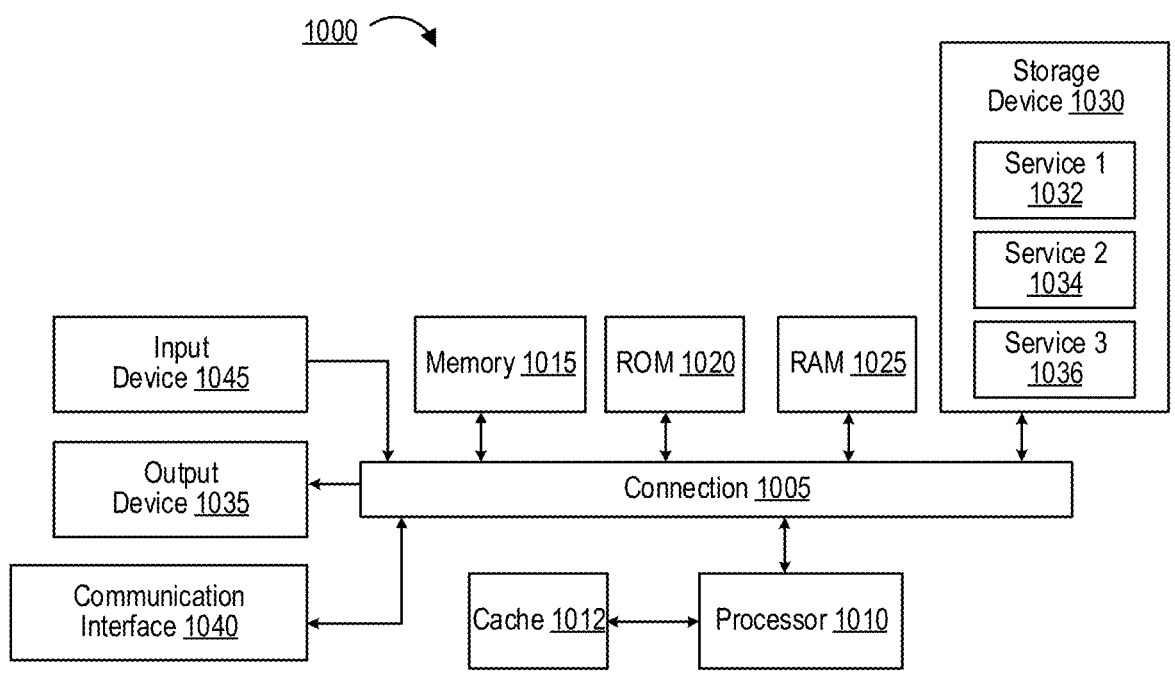
FIG. 10 is a diagram illustrating an example of a system for implementing certain aspects of the present technology.

FIG. 10 is a diagram illustrating an example of a system for implementing certain aspects of the present technology. In particular, FIG. 10 illustrates an example of computing system 1000, which can be for example any computing device or computing system making up the image capture and processing system 100, the image capture device 105A, the image processing device 105B, the image processor 150, the host processor 152, the ISP 154, the imaging system 250, the first exposure timing engine 230 for the first image sensor 220, the second exposure timing engine 235 for the second image sensor 225, the ROI identifier 240, an exposure timing synchronizer 245, the first output device 260, the second output device 265, one or more trained ML models, one or more trained NNs, one or more network servers, a camera, any combination thereof, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for imaging, the apparatus comprising: a memory; one or more processors coupled to the memory, the one or more processors configured to: identify a first exposure timing corresponding to capture of a first image by a first image sensor, wherein capture of the first image by the first image sensor according to the first exposure timing includes exposure of first region of interest image data at the first image sensor for a first ROI exposure time period; set a second exposure timing corresponding to capture of a second image by a second image sensor based on the first exposure timing, wherein capture of the second image by the second image sensor according to the second exposure timing includes exposure of second ROI image data at the second image sensor for a second ROI exposure time period that overlaps with the first ROI exposure time period; receive the first image from the first image sensor, the first image captured by the first image sensor according to the first exposure timing; receive the second image from the second image sensor, the second image captured by the second image sensor according to the second exposure timing.

Aspect 2. The apparatus of Aspect 1, wherein the first ROI image data corresponds to a row of image data in the first image, and wherein the second ROI image data corresponds to a row of image data in the second image.

Aspect 3. The apparatus of any of Aspects 1 to 2, wherein the first ROI image data depicts at least part of an object of interest in a scene, wherein the second ROI image data also depicts at least part of the object of interest in the scene.

Aspect 4. The apparatus of any of Aspects 1 to 3, wherein the one or more processors are configured to: identify, using an object detection algorithm, a first depiction of at least the part of the object of interest in a third image captured by the first image sensor before capture of the first image; identify, using the object detection algorithm, a second depiction of at least the part of the object of interest in a fourth image captured by the first image sensor before capture of the second image.

Aspect 5. The apparatus of any of Aspects 1 to 4, wherein the one or more processors configured to: receive an input through a user interface, the input identifying the object of interest.

Aspect 6. The apparatus of any of Aspects 1 to 5, wherein the first ROI image data includes a center of the first image, wherein the second ROI image data includes a center of the second image.

Aspect 7. The apparatus of any of Aspects 1 to 6, wherein the first image has a first field of view and the second image has a second field of view that differs from the first field of view.

Aspect 8. The apparatus of any of Aspects 1 to 7, wherein, to set the second exposure timing, the one or more processors are configured to align a start of the second ROI exposure time period with a start of the first ROI exposure time period.

Aspect 9. The apparatus of any of Aspects 1 to 8, wherein, to set the second exposure timing, the one or more processors are configured to align an end of the second ROI exposure time period with an end of the first ROI exposure time period.

Aspect 10. The apparatus of any of Aspects 1 to 9, wherein, to set the second exposure timing, the one or more processors are configured to align part of the second ROI exposure time period to be contemporaneous with part of the first ROI exposure time period.

Aspect 11. The apparatus of any of Aspects 1 to 10, wherein the one or more processors are configured to: identify a distance between the apparatus and a portion of a scene that is depicted in the first image and in the second image, wherein to identify the distance, the one or more processors are configured to perform stereo matching based on the first image and the second image.

Aspect 12. The apparatus of any of Aspects 1 to 11, wherein the one or more processors are configured to: generate a merged image at least by merging the first image and the second image.

Aspect 13. The apparatus of any of Aspects 1 to 12, further comprising: one or more displays, wherein the one or more processors are configured to display the first image and the second image on the one or more displays.

Aspect 14. The apparatus of any of Aspects 1 to 13, further comprising: a communication transceiver, wherein the one or more processors are configured to transmit at least one of first image and the second image using the communication transceiver.

Aspect 15. The apparatus of any of Aspects 1 to 14, further comprising: the first image sensor configured to capture the first image according to the first exposure timing; the second image sensor configured to capture the second image according to the second exposure timing.

Aspect 16. The apparatus of any of Aspects 1 to 15, wherein the one or more processors are configured to: receive a third image from the first image sensor, the third image captured by the first image sensor according to the first exposure timing; identify the first exposure timing based on the third image.

Aspect 17. The apparatus of any of Aspects 1 to 16, wherein the one or more processors are configured to: identify, before setting the second exposure timing, a prior second exposure timing corresponding to the second image sensor, wherein the second image sensor is configured to expose the second ROI image data for a prior second ROI exposure time period according to the prior second exposure timing; identify a timing difference between a start of the first ROI exposure time period and a start of a prior second ROI exposure time period, wherein, to set the second exposure timing, the one or more processors are configured to adjust the prior second exposure timing to reduce the timing difference.

Aspect 18. The apparatus of any of Aspects 1 to 17, wherein, to set the second exposure timing, the one or more processors are configured to move a start of exposure for the second image relative to a prior start of exposure for the second image based on the timing difference, the prior start of exposure for the second image corresponding to the prior second exposure timing.

Aspect 19. The apparatus of any of Aspects 1 to 18, wherein the one or more processors are configured to: receive a fourth image from the second image sensor, the fourth image captured by the second image sensor according to the prior second exposure timing; identify the prior second exposure timing based on exposure of the fourth image.

Aspect 20. A method of imaging, the method comprising: identifying a first exposure timing corresponding to capture of a first image by a first image sensor, wherein capture of the first image by the first image sensor according to the first exposure timing includes exposure of first region of interest image data from the first image sensor for a first ROI exposure time period; setting a second exposure timing corresponding to capture of a second image by a second image sensor based on the first exposure timing, wherein capture of the second image by the second image sensor according to the second exposure timing includes exposure of second ROI image data from the second image sensor for a second ROI exposure time period that overlaps with the first ROI exposure time period; receiving the first image from the first image sensor, the first image captured by the first image sensor according to the first exposure timing; receiving the second image from the second image sensor, the second image captured by the second image sensor according to the second exposure timing.

Aspect 21. The method of Aspect 20, wherein the first ROI image data corresponds to a row of image data in the first image, and wherein the second ROI image data corresponds to a row of image data in the second image.

Aspect 22. The method of any of Aspects 20 to 21, wherein the first ROI image data depicts at least part of an object of interest in a scene, wherein the second ROI image data also depicts at least part of the object of interest in the scene.

Aspect 23. The method of any of Aspects 20 to 22, further comprising: identifying, using an object detection algorithm, a first depiction of at least the part of the object of interest in a third image captured by the first image sensor before capture of the first image; identifying, using the object detection algorithm, a second depiction of at least the part of the object of interest in a fourth image captured by the first image sensor before capture of the second image.

Aspect 24. The method of any of Aspects 20 to 23, further comprising: receiving an input through a user interface, the input identifying the object of interest.

Aspect 25. The method of any of Aspects 20 to 24, wherein the first ROI image data includes a center of the first image, wherein the second ROI image data includes a center of the second image.

Aspect 26. The method of any of Aspects 20 to 25, wherein the first image has a first field of view and the second image has a second field of view that differs from the first field of view.

Aspect 27. The method of any of Aspects 20 to 26, wherein setting the second exposure timing includes aligning a start of the second ROI exposure time period with a start of the first ROI exposure time period.

Aspect 28. The method of any of Aspects 20 to 27, wherein setting the second exposure timing includes aligning an end of the second ROI exposure time period with an end of the first ROI exposure time period.

Aspect 29. The method of any of Aspects 20 to 28, wherein setting the second exposure timing includes aligning part of the second ROI exposure time period to be contemporaneous with part of the first ROI exposure time period.

Aspect 30. The method of any of Aspects 20 to 29, further comprising: identifying a distance between a device and a portion of a scene that is depicted in the first image and in the second image, wherein identifying the distance includes performing stereo matching based on the first image and the second image, wherein the device includes the first image sensor and the second image sensor.

Aspect 31. The method of any of Aspects 20 to 30, further comprising: generating a merged image at least by merging the first image and the second image.

Aspect 32. The method of any of Aspects 20 to 31, further comprising: displaying the first image and the second image on one or more displays.

Aspect 33. The method of any of Aspects 20 to 32, further comprising: transmit at least one of first image and the second image using a communication transceiver.

Aspect 34. The method of any of Aspects 20 to 33, wherein the method is performed by a device that includes the first image sensor that is configured to capture the first image according to the first exposure timing and the second image sensor that is configured to capture the second image according to the second exposure timing.

Aspect 35. The method of any of Aspects 20 to 34, further comprising: receiving a third image from the first image sensor, the third image captured by the first image sensor according to the first exposure timing; identifying the first exposure timing based on exposure of the third image.

Aspect 36. The method of any of Aspects 20 to 35, further comprising: before setting the second exposure timing, identifying a prior second exposure timing corresponding to the second image sensor, wherein the second image sensor is configured to expose the second ROI image data for a prior second ROI exposure time period according to the prior second exposure timing; identifying a timing difference between a start of the first ROI exposure time period and a start of a prior second ROI exposure time period, wherein setting the second exposure timing includes adjusting the prior second exposure timing to reduce the timing difference.

Aspect 37. The method of any of Aspects 20 to 36, wherein setting the second exposure timing includes moving a start of exposure for the second image relative to a prior start of exposure for the second image based on the timing difference, the prior start of exposure for the second image corresponding to the prior second exposure timing.

Aspect 38. The method of any of Aspects 20 to 37, further comprising: receiving a fourth image from the second image sensor, the fourth image captured by the second image sensor according to the prior second exposure timing; identifying the prior second exposure timing based on exposure of the fourth image.

Aspect 39: A non-transitory computer-readable medium that has stored thereon instructions that, when executed by one or more processors, cause the one or more processors to perform operations according to any of Aspects 20 to 38.

Aspect 40: An apparatus for image processing, apparatus comprising means for performing operations according to any of Aspects 20 to 38.

What is claimed is:

1. An apparatus for imaging, the apparatus comprising:
a memory; and
one or more processors coupled to the memory, the one or more processors configured to:
identify a first exposure timing corresponding to capture of a first image by a first image sensor, wherein capture of the first image by the first image sensor according to the first exposure timing includes exposure of first region of interest (ROI) image data at the first image sensor for a first ROI exposure time period;
identify a second exposure timing corresponding to a second image sensor, wherein the second image sensor is configured to expose second ROI image data for a second ROI exposure time period according to the second exposure timing;
identify a timing difference between a start of the first ROI exposure time period and a start of the second ROI exposure time period;
set a third exposure timing corresponding to capture of a second image by the second image sensor at least in part by adjusting the second exposure timing to reduce the timing difference, wherein capture of the second image by the second image sensor according to the third exposure timing includes exposure of the second ROI image data at the second image sensor for a third ROI exposure time period that overlaps with the first ROI exposure time period;
receive the first image from the first image sensor, the first image captured by the first image sensor according to the first exposure timing; and
receive the second image from the second image sensor, the second image captured by the second image sensor according to the third exposure timing.

2. The apparatus of claim 1, wherein the first ROI image data corresponds to a row of image data in the first image, and wherein the second ROI image data corresponds to a row of image data in the second image.

3. The apparatus of claim 1, wherein the first ROI image data depicts at least part of an object of interest in a scene, wherein the second ROI image data also depicts at least part of the object of interest in the scene.

4. The apparatus of claim 3, wherein the one or more processors are configured to:
identify, using an object detection algorithm, a first depiction of at least the part of the object of interest in a third image captured by the first image sensor before capture of the first image; and
identify, using the object detection algorithm, a second depiction of at least the part of the object of interest in a fourth image captured by the second image sensor before capture of the second image.

5. The apparatus of claim 3, wherein the one or more processors configured to:
receive an input through a user interface, the input identifying the object of interest.

6. The apparatus of claim 1, wherein the first ROI image data includes a center of the first image, wherein the second ROI image data includes a center of the second image.

7. The apparatus of claim 1, wherein the first image has a first field of view and the second image has a second field of view that differs from the first field of view.

8. The apparatus of claim 1, wherein, to set the third exposure timing, the one or more processors are configured to align the start of the third ROI exposure time period with the start of the first ROI exposure time period.

9. The apparatus of claim 1, wherein, to set the third exposure timing, the one or more processors are configured to align an end of the third ROI exposure time period with an end of the first ROI exposure time period.

10. The apparatus of claim 1, wherein, to set the third exposure timing, the one or more processors are configured to align part of the third ROI exposure time period to be contemporaneous with part of the first ROI exposure time period.

11. The apparatus of claim 1, wherein the one or more processors are configured to:
identify a distance between the apparatus and a portion of a scene that is depicted in the first image and in the second image, wherein to identify the distance, the one or more processors are configured to perform stereo matching based on the first image and the second image.

12. The apparatus of claim 1, wherein the one or more processors are configured to:
generate a merged image at least by merging the first image and the second image.

13. The apparatus of claim 1, further comprising:
one or more displays, wherein the one or more processors are configured to display the first image and the second image on the one or more displays.

14. The apparatus of claim 1, further comprising:
a communication transceiver, wherein the one or more processors are configured to transmit at least one of first image and the second image using the communication transceiver.

15. The apparatus of claim 1, further comprising:
the first image sensor configured to capture the first image according to the first exposure timing; and
the second image sensor configured to capture the second image according to the third exposure timing.

16. The apparatus of claim 1, wherein the one or more processors are configured to:
receive a third image from the first image sensor, the third image captured by the first image sensor according to the first exposure timing, wherein, to identify the first exposure timing, the one or more processors are configured to identify the first exposure timing based on exposure of the third image.

17. The apparatus of claim 1, wherein, to set the third exposure timing, the one or more processors are configured to move a start of exposure for the second image relative to a prior start of exposure for the second image based on the timing difference, the prior start of exposure for the second image corresponding to the second exposure timing.

18. The apparatus of claim 1, wherein the one or more processors are configured to:
receive a fourth image from the second image sensor, the fourth image captured by the second image sensor according to the second exposure timing, wherein, to identify the second exposure timing, the one or more processors are configured to identify the second exposure timing based on exposure of the fourth image.

19. A method of imaging, the method comprising:
identifying a first exposure timing corresponding to capture of a first image by a first image sensor, wherein capture of the first image by the first image sensor according to the first exposure timing includes exposure of first region of interest (ROI) image data from the first image sensor for a first ROI exposure time period;
identifying a second exposure timing corresponding to a second image sensor, wherein the second image sensor is configured to expose second ROI image data for a second ROI exposure time period according to the second exposure timing;
identifying a timing difference between a start of the first ROI exposure time period and a start of the second ROI exposure time period;
set a third exposure timing corresponding to capture of a second image by the second image sensor at least in part by adjusting the second exposure timing to reduce the timing difference, wherein capture of the second image by the second image sensor according to the third exposure timing includes exposure of the second ROI image data from the second image sensor for a third ROI exposure time period that overlaps with the first ROI exposure time period;
receiving the first image from the first image sensor, the first image captured by the first image sensor according to the first exposure timing; and
receiving the second image from the second image sensor, the second image captured by the second image sensor according to the third exposure timing.

20. The method of claim 19, wherein the first ROI image data corresponds to a row of image data in the first image, and wherein the second ROI image data corresponds to a row of image data in the second image.

21. The method of claim 19, wherein the first ROI image data depicts at least part of an object of interest in a scene, wherein the second ROI image data also depicts at least part of the object of interest in the scene.

22. The method of claim 21, further comprising:
identifying, using an object detection algorithm, a first depiction of at least the part of the object of interest in a third image captured by the first image sensor before capture of the first image; and
identifying, using the object detection algorithm, a second depiction of at least the part of the object of interest in a fourth image captured by the second image sensor before capture of the second image.

23. The method of claim 19, wherein setting the third exposure timing includes aligning a part of the third ROI exposure time period to be contemporaneous with part of the first ROI exposure time period.

24. The method of claim 19, wherein the first ROI image data includes a center of the first image, wherein the second ROI image data includes a center of the second image.

25. The method of claim 19, wherein setting the third exposure timing includes aligning the start of the third ROI exposure time period with the start of the first ROI exposure time period.

26. The method of claim 19, further comprising:
identifying a distance between a device and a portion of a scene that is depicted in the first image and in the second image, wherein identifying the distance includes performing stereo matching based on the first image and the second image, wherein the device includes the first image sensor and the second image sensor.

27. The method of claim 19, further comprising:
generating a merged image at least by merging the first image and the second image.

28. The method of claim 19, further comprising:
receiving a third image from the first image sensor, the third image captured by the first image sensor according to the first exposure timing, wherein identifying the first exposure timing is based on exposure of the third image.

29. The method of claim 19, wherein setting the third exposure timing includes moving a start of exposure for the second image relative to a prior start of exposure for the second image based on the timing difference, the prior start of exposure for the second image corresponding to the second exposure timing.

30. The method of claim 19, further comprising:
receiving a fourth image from the second image sensor, the fourth image captured by the second image sensor according to the second exposure timing, wherein identifying the second exposure timing is based on exposure of the fourth image.

* * * * *